US008533150B2

(12) United States Patent
Karasudani et al.

(10) Patent No.: US 8,533,150 B2
(45) Date of Patent: *Sep. 10, 2013

(54) SEARCH INDEX GENERATION APPARATUS

(75) Inventors: Akira Karasudani, Kawasaki (JP); Takahiro Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 170 days.

This patent is subject to a terminal disclaimer.

(21) Appl. No.: 11/742,077

(22) Filed: Apr. 30, 2007

(65) Prior Publication Data

US 2008/0065682 A1 Mar. 13, 2008

(30) Foreign Application Priority Data

Sep. 13, 2006 (JP) ................................ 2006-247451

(51) Int. Cl.
*G06F 17/30* (2006.01)

(52) U.S. Cl.
USPC ............ 707/602; 707/603; 707/665; 707/667

(58) Field of Classification Search
USPC .............. 707/3, 5, 104.1, 769, 726, 690, 665, 707/634, 667, 603, 602, 999.003, 635; 717/124
See application file for complete search history.

(56) References Cited

U.S. PATENT DOCUMENTS

| | | | |
|---|---|---|---|
| 5,974,412 A | 10/1999 | Hazlehurst et al. | |
| 5,999,975 A | 12/1999 | Kittaka et al. | |
| 6,012,053 A * | 1/2000 | Pant et al. .............................. | 1/1 |
| 6,065,001 A | 5/2000 | Ohkubo et al. | |
| 6,119,117 A | 9/2000 | Yoda et al. | |
| 6,134,532 A * | 10/2000 | Lazarus et al. ............. | 705/14.25 |
| 6,778,979 B2 | 8/2004 | Grefenstette et al. | |
| 7,162,473 B2 | 1/2007 | Dumais et al. | |
| 7,451,162 B2 * | 11/2008 | Hess .......................... | 707/104.1 |
| 7,496,563 B2 * | 2/2009 | Newbold et al. .................. | 707/3 |
| 7,665,024 B1 * | 2/2010 | Kondziela ...................... | 715/745 |
| 7,707,284 B2 | 4/2010 | Friedman et al. | |
| 2001/0018698 A1 | 8/2001 | Uchino et al. | |
| 2001/0049689 A1 * | 12/2001 | Mentzer ..................... | 707/104.1 |
| 2002/0059227 A1 | 5/2002 | Narahara | |
| 2002/0147754 A1 * | 10/2002 | Dempsey et al. ............. | 708/671 |

(Continued)

FOREIGN PATENT DOCUMENTS

| | | |
|---|---|---|
| JP | 10-320419 | 12/1998 |
| JP | 11-39293 | 2/1999 |

(Continued)

OTHER PUBLICATIONS

Anton N. Dragunov et al., TaskTracer: A Desktop Environment to Support Multi-tasking Knowledge Workers, Jan. 2005, pp. 75-82.*

(Continued)

*Primary Examiner* — Sherief Badawi
(74) *Attorney, Agent, or Firm* — Staas & Halsey LLP

(57) ABSTRACT

A search index generation apparatus includes: an information manipulation monitor unit detecting an information manipulation performed by a user on a computer by monitoring the information manipulation of the user on the computer; an information manipulation database for accumulation of data relating to an information manipulation detected by the information manipulation monitor unit; and a task detection unit analyzing the data relating to the information manipulation accumulated in the information manipulation database, detecting a task of the user, identifying an information group processed in the task, and recording the data relating to the task in the task database.

19 Claims, 26 Drawing Sheets

(56) References Cited

U.S. PATENT DOCUMENTS

| | | | |
|---|---|---|---|
| 2004/0030996 A1* | 2/2004 | Van Liempd et al. | 715/526 |
| 2004/0205723 A1* | 10/2004 | Juan et al. | 717/124 |
| 2004/0230645 A1 | 11/2004 | Bodin et al. | |
| 2004/0267730 A1* | 12/2004 | Dumais et al. | 707/3 |
| 2007/0112792 A1* | 5/2007 | Majumder | 707/100 |
| 2007/0136235 A1* | 6/2007 | Hess | 707/2 |
| 2007/0299631 A1* | 12/2007 | Macbeth et al. | 702/187 |
| 2008/0071761 A1* | 3/2008 | Singh et al. | 707/5 |

FOREIGN PATENT DOCUMENTS

| | | |
|---|---|---|
| JP | 11-143912 | 5/1999 |
| JP | 11-250080 | 9/1999 |
| JP | 11-265378 | 9/1999 |
| JP | 2000-172696 | 6/2000 |
| JP | 2002-32388 | 1/2002 |
| JP | 3547069 | 4/2004 |
| JP | 2005-309727 | 11/2005 |
| WO | 02/37839 | 5/2002 |

OTHER PUBLICATIONS

Jay Budzik et al., Selecting Task-Relevant Sources for Just-in-Time Retrieval, pp. 1-3.*

S. Stumpf et al., "Predicting User Tasks: I Know What You're Doing!", AAAI Workshop—Tech. Report 2005, vol. WS-05-04, pp. 14-19.

F. Wiesman et al., "Information retrieval: an overview of system characteristics", International Journal of Medical Informatics, vol. 47, Nos. 1-2, Elsevier Scientific Publishers, Nov. 1997, pp. 5-26.

R. Baeza-Yates et al., Modern Information Retrieval, ACM Press/Longman Limited,1999, pp. 18-71.

J. Canny, "GaP: A Factor Model for Discrete Data", Proceedings of Twenty-Seventh Annual International ACM SIGIR Conference on Research and Development in Information Retrieval, 2004, pp. 122-129.

L. Matthijssen, "A Task-Based Interface to Legal Databases", Artificial Intelligence and Law, Mar. 1998, pp. 81-103.

D. B. Leake et al., "Integrating Information Resources: A Case Study of Engineering Design Support", LNCS 1650: Case-Based Reasoning Research and Development, Jan. 1999, Springer-Verlag, 1999, pp. 482-496.

European Communication dated Aug. 14, 2008, issued in the corresponding European Patent Application No. 07106582.5-2201.

D. Leake et al., "Selecting Task-Relevant Sources for Just-in-Time Retrieval," 1999, XP002432900, URL: http://ftp.cs.indiana.edu/pub/leake/leake/p-99-03.pdf.

M. H. Smith et al., "FuzzyBase: An Information—Intelligent Retrieval System," Systems, Man, and Cybernetics, 1998, IEEE International Conference, vol. 3, pp. 2797-2802, XP010310661.

G. Xiangzhu et al., "A Dynamic information Retrieval System for the Web," Proceedings of the 27$^{th}$ Annual International Computer Software and Applications Conference, COMPSAC 2003, vol. Conf. 26, pp. 670-675, XP010669686.

M. Bamshad et al., "Automatic Personalization Based on Web Usage Mining," 2000, pp. 142-151, XP002432901, URL:http://portal.acm.org.

Non-Final Office Action mailed Apr. 1, 2009; U.S. Appl. No. 11/564,412.

European Office Action mailed Aug. 17, 2009 and issued in corresponding European Patent Application 06 255 990.1.

U.S. Appl. No. 11/564,412, Nov. 29, 2006, Karasudani et al., Fujitsu Limited.

U.S. Office Action mailed Dec. 30, 2009 in related U.S. Appl. No. 11/564,412.

U.S. Office Action mailed Aug. 3, 2010 in related U.S. Appl. No. 11/564,412.

Japanese Office Action issued Feb. 22, 2011 in corresponding Japanese Patent Application 2006-247451.

Office Action for co-pending U.S. Appl. No. 11/564,412; mailed Feb. 8, 2011.

Japanese Office Action issued Apr. 19, 2011 in corresponding Japanese Patent Application 2006-207075.

U.S. Office Action mailed Jun. 23, 2011 in related U.S. Appl. No. 11/564,412.

Office Action for co-pending U.S. Appl. No. 11/564,412; mailed Dec. 21, 2011.

U.S. Office Action dated Dec. 21, 2011 issued in related U.S. Appl. No. 11/564,412.

U.S. Appl. No. 11/564,412, filed Nov. 29, 2006, Akira Karasudani et al., Fujitsu Limited.

* cited by examiner

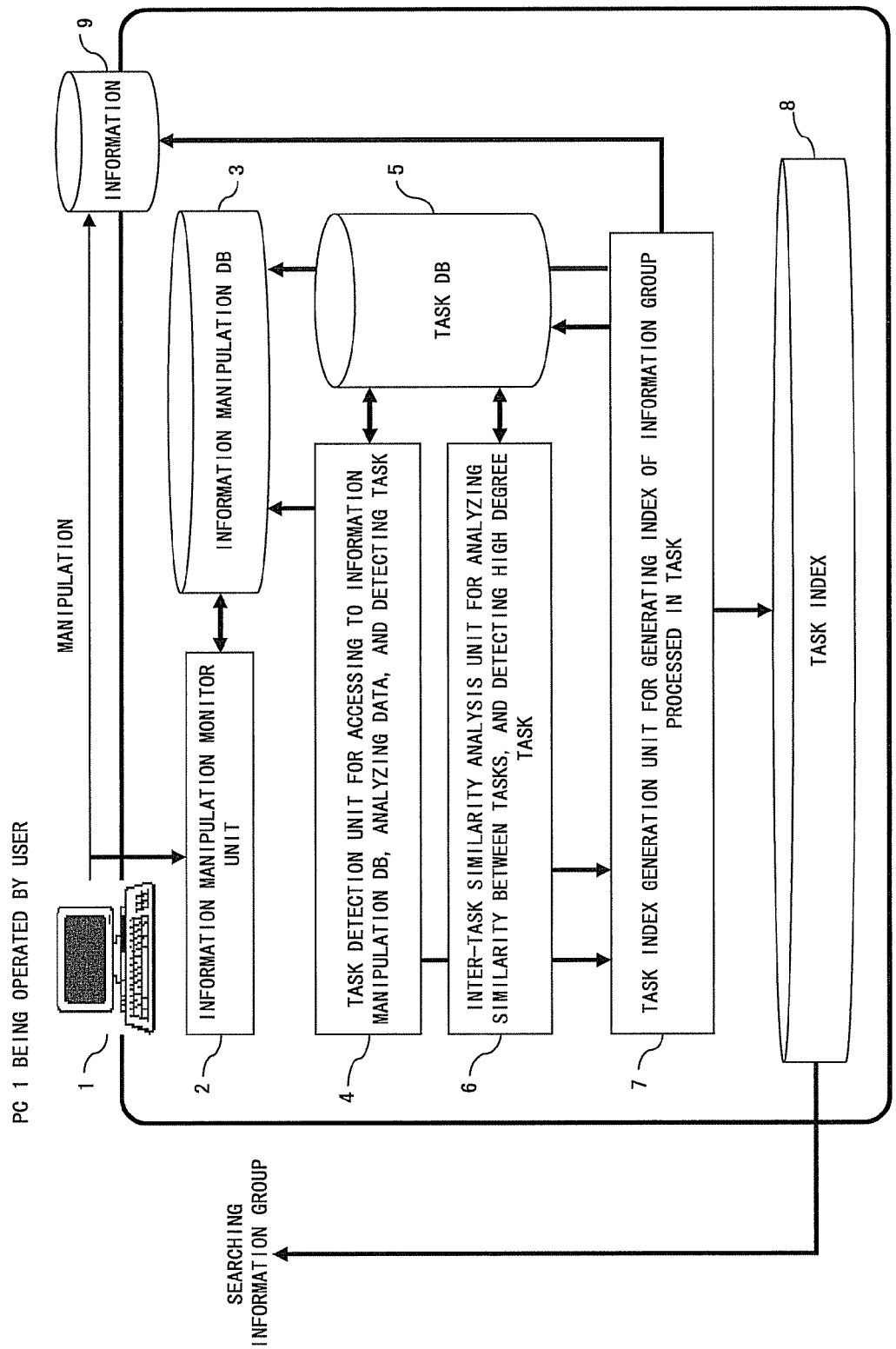
F I G. 2

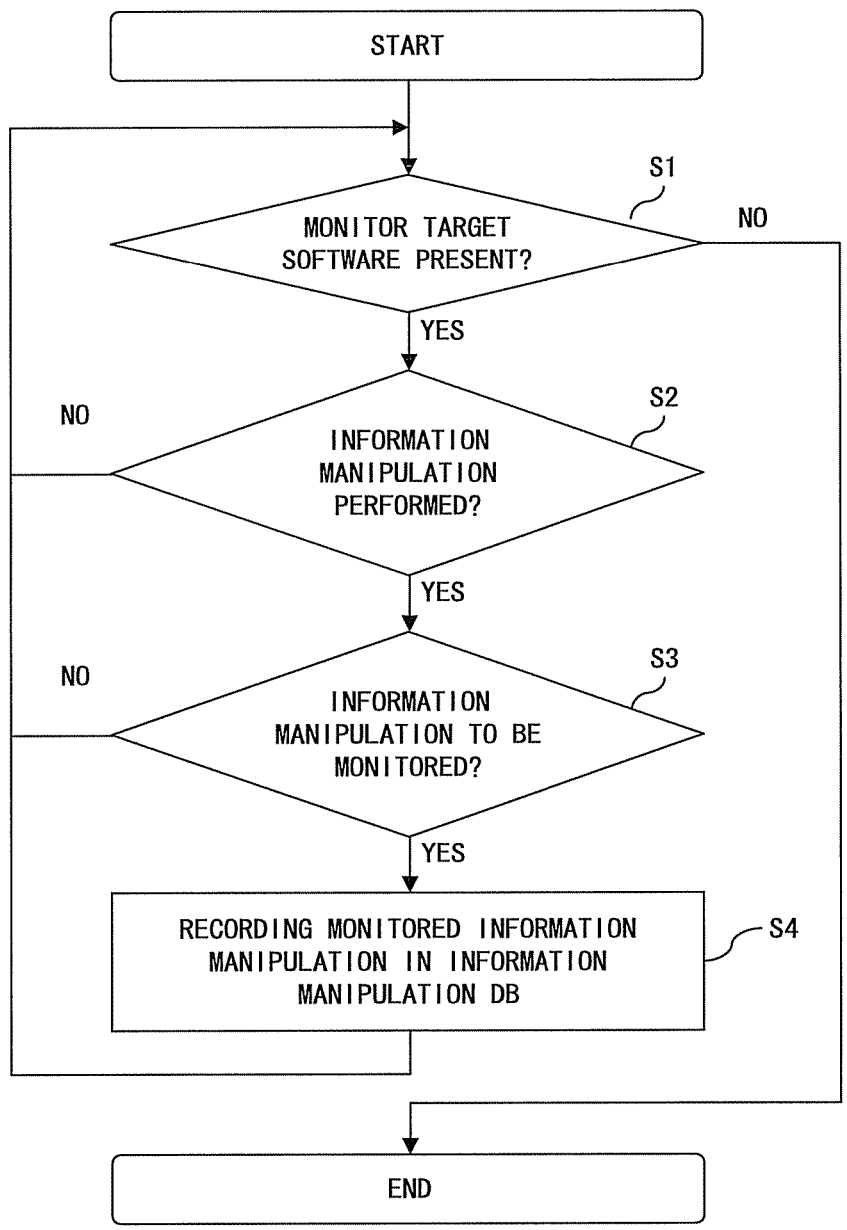
F I G. 4

| MANIPULATION ID | DATE | TIME | MANIPULATION | MANIPULATION TARGET | DETAILED MANIPULATION | USER | PC NAME |
|---|---|---|---|---|---|---|---|
| 0001 | Sep/13/06 | 10:00 AM | OPEN | FILE A1 | – | Ben | PC1 |
| 0002 | Sep/13/06 | 10:05 AM | OPEN | FILE B1 | – | Ben | PC1 |
| 0003 | Sep/13/06 | 10:10 AM | DATA COPY | FILE A1 | COPY SOURCE: FILE B1 COPY CONTENTS:AAA | Ben | PC1 |
| 0004 | Sep/13/06 | 11:30 AM | SAVE | FILE A1 | – | Ben | PC1 |
| 0005 | Sep/13/06 | 11:35 AM | PRINT | FILE A1 | – | Ben | PC1 |
| 0006 | Sep/13/06 | 11:45 AM | CLOSE | FILE A1 | | Ben | PC1 |
| 0007 | Sep/13/06 | 12:00 PM | CLOSE | FILE B1 | – | Ben | PC1 |
| 0008 | Sep/14/06 | 11:20 AM | OPEN | FILE A2 | – | Ben | PC1 |
| 0009 | Sep/14/06 | 12:10 PM | OPEN | FILE C1 | – | Ben | PC1 |
| 0010 | Sep/14/06 | 12:15 PM | CLOSE | FILE C1 | – | Ben | PC1 |
| 0011 | Sep/14/06 | 12:35 PM | CLOSE | FILE A2 | – | Ben | PC1 |
| 0012 | Sep/15/06 | 11:00 AM | OPEN | FILE A2 | – | Ben | PC1 |
| | ... | ... | ... | ... | ... | ... | ... |
| | ... | ... | ... | ... | ... | ... | ... |

F I G. 5

| MANIPULATION ID | DATE | TIME | MANIPULATION | MANIPULATION TARGET | DETAILED MANIPULATION | USER | PC NAME |
|---|---|---|---|---|---|---|---|
| 0001 | Sep/13/06 | 10:00 AM | OPEN | FILE A1 | − | Ben | PC1 |
| 0002 | Sep/13/06 | 10:05 AM | OPEN | FILE B1 | − | Ben | PC1 |
| 0003 | Sep/13/06 | 10:10 AM | DATA COPY | FILE A1 | COPY SOURCE: FILE B1 COPY CONTENTS: AAA | Ben | PC1 |
| 0004 | Sep/13/06 | 11:30 AM | SAVE | FILE A1 | − | Ben | PC1 |
| 0005 | Sep/13/06 | 11:35 AM | PRINT | FILE A1 | − | Ben | PC1 |
| 0006 | Sep/13/06 | 11:45 AM | CLOSE | FILE A1 |  | Ben | PC1 |
| 0007 | Sep/13/06 | 12:00 PM | CLOSE | FILE B1 | − | Ben | PC1 |
| 0008 | Sep/14/06 | 11:20 AM | OPEN | FILE A2 | − | Ben | PC1 |
| 0009 | Sep/14/06 | 12:10 PM | OPEN | FILE C1 | − | Ben | PC1 |
| 0010 | Sep/14/06 | 12:15 PM | CLOSE | FILE C1 | − | Ben | PC1 |
| 0011 | Sep/14/06 | 12:35 PM | CLOSE | FILE A2 | − | Ben | PC1 |
|  |  |  |  |  |  |  |  |

F I G. 8

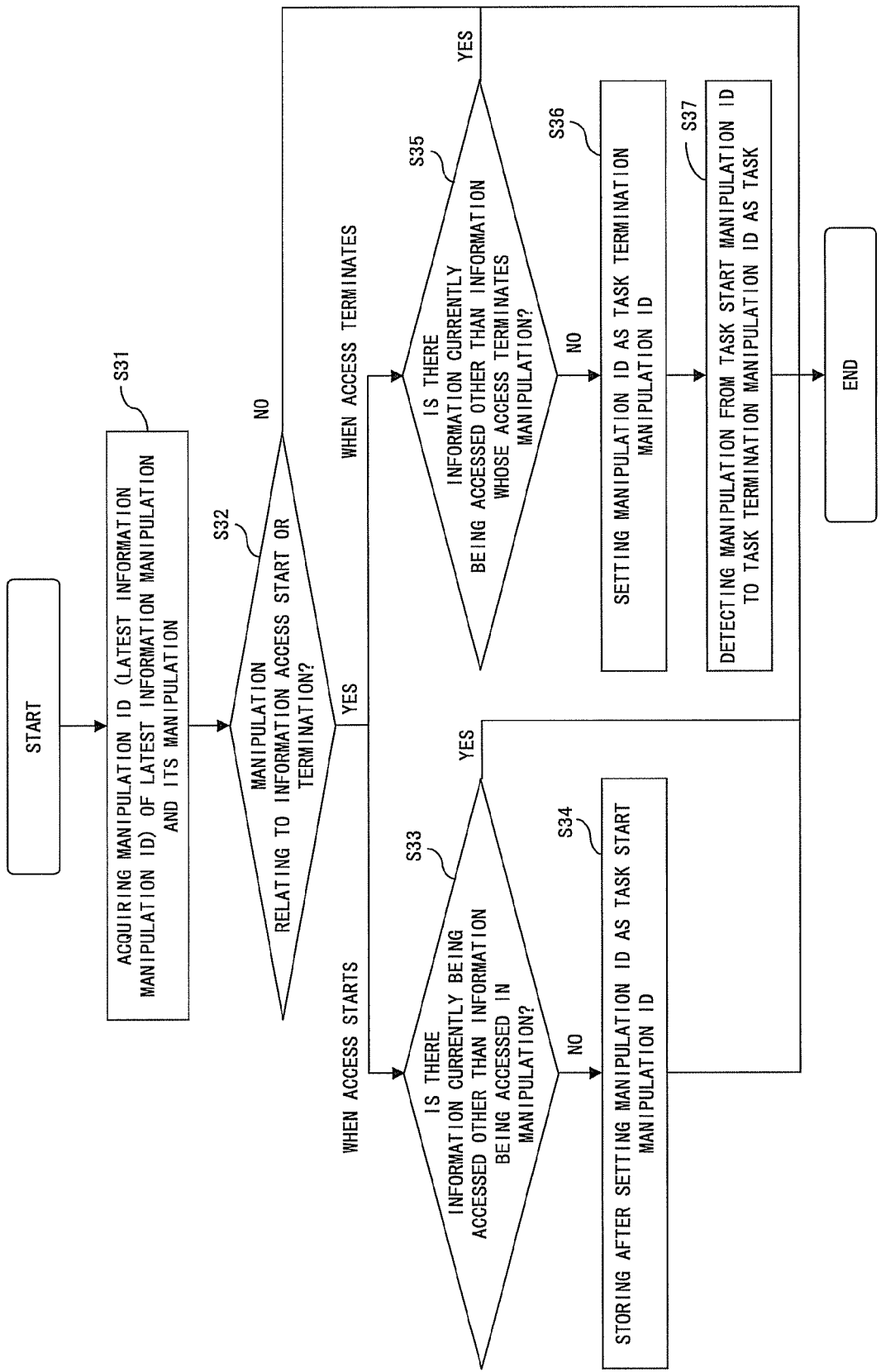
F I G. 9

| MANIPULATION ID | DATE | TIME | MANIPULATION | MANIPULATION TARGET | DETAILED MANIPULATION | USER | PC NAME |
|---|---|---|---|---|---|---|---|
| 0001 | Sep/13/06 | 10:00 AM | OPEN | FILE A1 | – | Ben | PC1 |
| 0002 | Sep/13/06 | 10:05 AM | OPEN | FILE B1 | – | Ben | PC1 |
| 0003 | Sep/13/06 | 10:10 AM | DATA COPY | FILE A1 | COPY SOURCE: FILE B1 COPY CONTENTS:AAA | Ben | PC1 |
| 0004 | Sep/13/06 | 11:30 AM | SAVE | FILE A1 | – | Ben | PC1 |
| 0005 | Sep/13/06 | 11:35 AM | PRINT | FILE A1 | – | Ben | PC1 |
| 0006 | Sep/13/06 | 11:45 AM | CLOSE | FILE A1 | | Ben | PC1 |
| 0007 | Sep/13/06 | 12:00 PM | CLOSE | FILE B1 | – | Ben | PC1 |
| 0008 | Sep/14/06 | 11:20 AM | OPEN | FILE A2 | – | Ben | PC1 |
| 0009 | Sep/14/06 | 12:10 PM | OPEN | FILE C1 | – | Ben | PC1 |
| 0010 | Sep/14/06 | 12:15 PM | CLOSE | FILE C1 | – | Ben | PC1 |
| 0011 | Sep/14/06 | 12:35 PM | CLOSE | FILE A2 | – | Ben | PC1 |
| | | | | | | | |

FIG. 10

| MANIPULATION ID | DATE | TIME | MANIPULATION | MANIPULATION TARGET | DETAILED MANIPULATION | USER | PC NAME |
|---|---|---|---|---|---|---|---|
| 0001 | Sep/13/06 | 10:00 AM | OPEN | FILE A1 | - | Ben | PC1 |
| 0002 | Sep/13/06 | 10:05 AM | OPEN | FILE B1 | - | Ben | PC1 |
| 0003 | Sep/13/06 | 10:10 AM | DATA COPY | FILE A1 | COPY SOURCE: FILE B1 COPY CONTENTS: AAA | Ben | PC1 |
| 0004 | Sep/13/06 | 11:30 AM | SAVE | FILE A1 | - | Ben | PC1 |
| 0005 | Sep/13/06 | 11:35 AM | PRINT | FILE A1 | - | Ben | PC1 |
| 0006 | Sep/13/06 | 11:45 AM | CLOSE | FILE A1 | | Ben | PC1 |
| 0007 | Sep/13/06 | 12:00 PM | CLOSE | FILE B1 | - | Ben | PC1 |
| 0008 | Sep/14/06 | 11:20 AM | OPEN | FILE A2 | - | Ben | PC1 |
| 0009 | Sep/14/06 | 12:10 PM | OPEN | FILE C1 | - | Ben | PC1 |
| | | | | | | | |

FIG. 12A

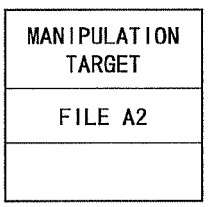

FIG. 12B

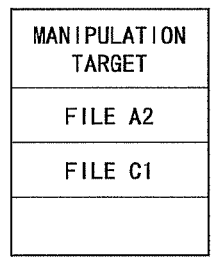

FIG. 12C

- ELEMENT OF VECTOR: FREQUENCY OF EACH WORD CONTAINED IN MANIPULATION TARGET
- SIMILARITY: ANGLE BETWEEN MANIPULATION TARGET VECTOR 1 AND MANIPULATION TARGET VECTOR 2

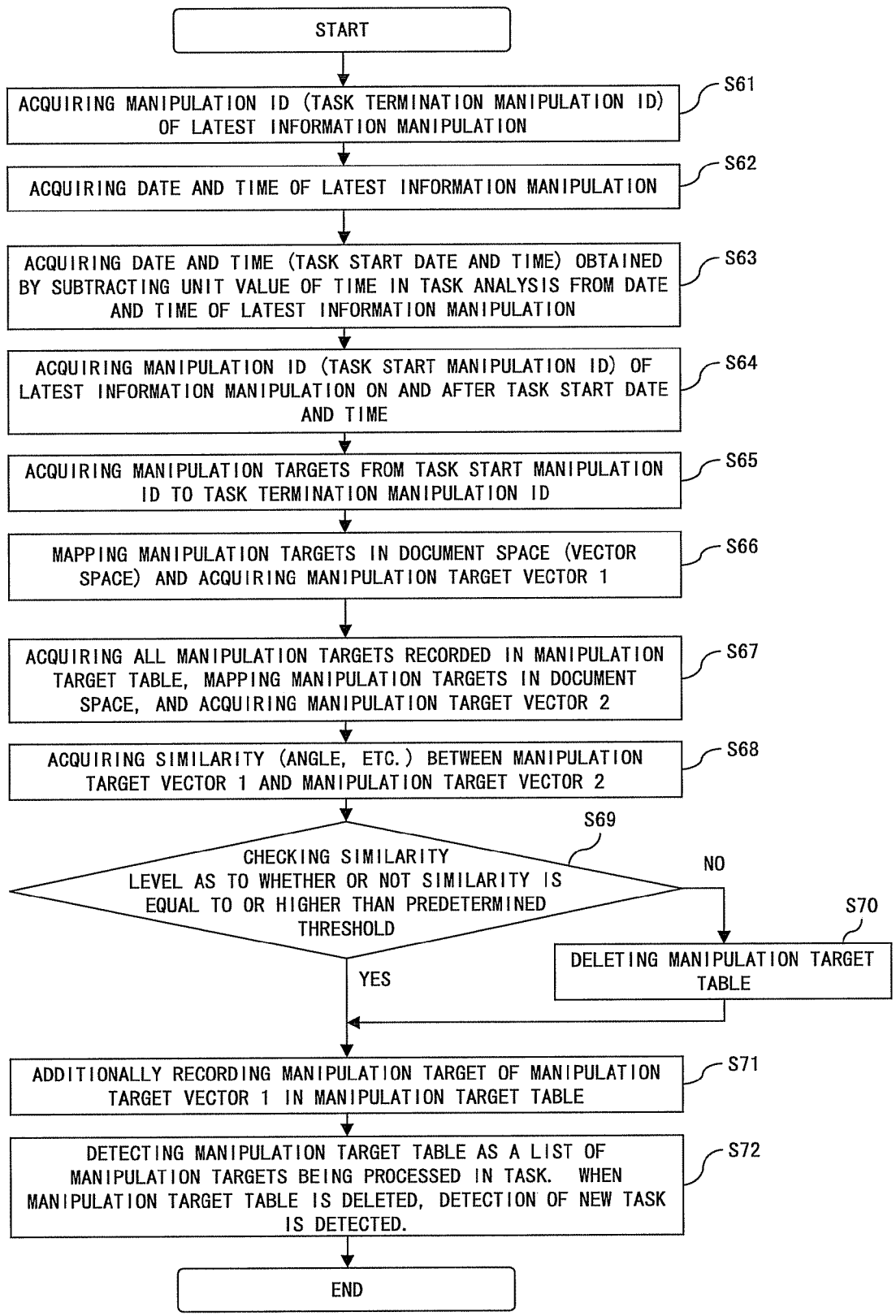
F I G. 1 4

| MANIPULATION ID | DATE | TIME | MANIPULATION | MANIPULATION TARGET | DETAILED MANIPULATION | USER | PC NAME |
|---|---|---|---|---|---|---|---|
| 0001 | Sep/13/06 | 10:00 AM | OPEN | FILE A1 | - | Ben | PC1 |
| 0002 | Sep/13/06 | 10:05 AM | OPEN | FILE B1 | - | Ben | PC1 |
| 0003 | Sep/13/06 | 10:10 AM | DATA COPY | FILE A1 | COPY SOURCE: FILE B1 COPY CONTENTS:AAA | Ben | PC1 |
| 0004 | Sep/13/06 | 11:30 AM | SAVE | FILE A1 | - | Ben | PC1 |
| 0005 | Sep/13/06 | 11:35 AM | PRINT | FILE A1 | - | Ben | PC1 |
| 0006 | Sep/13/06 | 11:45 AM | CLOSE | FILE A1 | | Ben | PC1 |
| 0007 | Sep/13/06 | 12:00 PM | CLOSE | FILE B1 | - | Ben | PC1 |
| 0008 | Sep/14/06 | 11:20 AM | OPEN | FILE A2 | - | Ben | PC1 |
| 0009 | Sep/14/06 | 12:10 PM | OPEN | FILE C1 | - | Ben | PC1 |
| 0010 | Sep/14/06 | 12:15 PM | CLOSE | FILE C1 | - | Ben | PC1 |
| 0011 | Sep/14/06 | 12:35 PM | CLOSE | FILE A2 | - | Ben | PC1 |
| 0012 | Sep/14/06 | 13:00 PM | OPEN | EMAIL D1 | - | Ben | PC1 |
| | | | | | | | |

FIG. 15A

| MANIPULATION TARGET |
|---|
| FILE A2 |
| FILE C1 |
| |

FIG. 15B

| MANIPULATION TARGET |
|---|
| FILE A2 |
| FILE C1 |
| EMAIL D1 |
| |

FIG. 15C

| MANIPULATION ID | DATE | TIME | MANIPULATION | MANIPULATION TARGET | DETAILED MANIPULATION | USER | PC NAME |
|---|---|---|---|---|---|---|---|
| 0001 | Sep/13/06 | 10:00 AM | OPEN | FILE A1 | – | Ben | PC1 |
| 0002 | Sep/13/06 | 10:05 AM | OPEN | FILE B1 | – | Ben | PC1 |
| 0003 | Sep/13/06 | 10:10 AM | DATA COPY | FILE A1 | COPY SOURCE: FILE B1 COPY CONTENTS:AAA | Ben | PC1 |
| 0004 | Sep/13/06 | 11:30 AM | SAVE | FILE A1 | – | Ben | PC1 |
| 0005 | Sep/13/06 | 11:35 AM | PRINT | FILE A1 | – | Ben | PC1 |
| 0006 | Sep/13/06 | 11:45 AM | CLOSE | FILE A1 | | Ben | PC1 |
| 0007 | Sep/13/06 | 12:00 PM | CLOSE | FILE B1 | – | Ben | PC1 |
| 0008 | Sep/14/06 | 11:20 AM | OPEN | FILE A2 | – | Ben | PC1 |
| 0009 | Sep/14/06 | 12:10 PM | OPEN | FILE C1 | – | Ben | PC1 |
| 0010 | Sep/14/06 | 12:15 PM | CLOSE | FILE C1 | – | Ben | PC1 |
| 0011 | Sep/14/06 | 12:35 PM | CLOSE | FILE A2 | – | Ben | PC1 |
| 0012 | Sep/14/06 | 13:00 PM | OPEN | EMAIL D1 | – | Ben | PC1 |
| 0013 | Sep/14/06 | 13:10 PM | CLOSE | EMAIL D1 | – | Ben | PC1 |
| | | | | | | | |

FIG. 17A

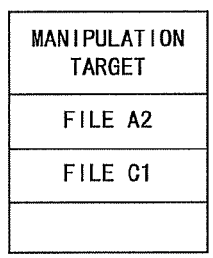

FIG. 17B

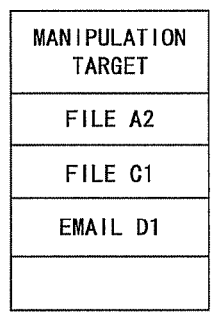

FIG. 17C

| TASK ID | RECORDING DATE | RECORDING TIME | MANIPULATION TARGET | TARGET MANIPULATION ID | USER | PC NAME |
|---|---|---|---|---|---|---|
| 0001 | Sep/13/06 | 12:00 PM | FILE A1 | 001, 003, 004, 006, 006 | Ben | PC1 |
| | | | FILE B1 | 002, 007 | | |
| 0002 | Sep/14/06 | 13:10 PM | FILE A2 | 008, 0011 | Ben | PC1 |
| | | | FILE C1 | 009, 0010 | | |
| | | | EMAIL D1 | 0012, 0013 | | |
| 0003 | Sep/15/06 | ... | ... | ... | ... | ... |
| | | | ... | ... | | |

FIG. 19

| TASK ID | RECORDING DATE | RECORDING TIME | MANIPULATION TARGET | TARGET MANIPULATION ID | USER | PC NAME | TASK MULTIPLICITY | MULTIPLEXED TASK ID |
|---|---|---|---|---|---|---|---|---|
| 0001 | Sep/13/06 | 12:00 PM | FILE A1 | 001, 003, 004, 006, 006 | Ben | PC1 | 0 | – |
| | | | FILE B1 | 002, 007 | | | | – |
| 0002 | Sep/14/06 | 13:10 PM | FILE A2 | 008, 0011 | Ben | PC1 | 0 | – |
| | | | FILE C1 | 009, 0010 | | | | – |
| | | | EMAIL D1 | 0012, 0013 | | | | – |
| 0003 | Sep/15/06 | ... | ... | ... | ... | ... | 0 | – |
| | | | ... | ... | | | | – |
| 0004 | Sep/15/06 | 00:00AM | ... | ... | ... | ... | 1 | 0001 |
| | | | | | | | | 0002 |

FIG. 21

| ID OF SEGMENTED ELEMENT | CONTENTS OF ELEMENT AND ATTRIBUTE | NUMBER OF MANIPULATION TARGETS CONTAINING THE ELEMENT (DF:Document Frequency) | RECORDING DATE AND TIME |
|---|---|---|---|
| T0001 | PATENT | 5 | Sep/14/06 10:00AM |
| T0002 | TASK | 10 | Sep/14/06 10:00AM |
| T0003 | INDEX | 20 | Sep/14/06 11:00AM |
| ... | ... | | ... |
| ... | ... | | ... |

F I G. 23A

| TASK ID | ELEMENT ID | NUMBER OF ELEMENTS OF ELEMENT ID IN ALL MANIPULATION TARGETS PERFORMED IN THE TASK(TF:Term Frequency) | SEARCH WEIGHT OF ELEMENT OF ELEMENT ID (TF×Inverted DF = TF/DF) | RECORDING DATE AND TIME |
|---|---|---|---|---|
| 0001 | T0001 | 10 | 2 | Sep/14/06 10:00AM |
| 0001 | T0002 | 15 | 1.5 | Sep/14/06 10:00AM |
| 0001 | T0004 | 20 | ... | Sep/14/06 10:00AM |
| ... | ... | ... | ... | ... |
| 0002 | T0001 | 5 | 1 | Sep/14/06 11:00AM |
| 0002 | T0003 | 5 | 0.25 | Sep/14/06 11:00AM |
| ... | ... | ... | ... | ... |
| 0003 | ... | ... | ... | ... |
| ... | ... | ... | ... | ... |
| ... | ... | ... | ... | ... |

F I G. 23B

SEARCH INDEX GENERATION APPARATUS

BACKGROUND OF THE INVENTION

1. Field of the Invention

The present invention relates to the technology of generating a search index in a system for searching information (file, email, etc.) using a computer.

2. Description of the Related Art

There have been the following two techniques for generating a search index (hereinafter referred to as simply an "index") in an information search system.

a. Generating an index for each piece of information

It is a technique of generating an index by extracting a keyword and an attribute (hereinafter referred to as a "meta-data") for each piece of information to be searched. It compares each piece of information with a search feature information (hereinafter also referred to as a "query") during search, and returns the information satisfying the search feature information. A number of information search systems such as Google (registered trademark), MSN Search (MSN is a registered trademark), etc. generate an index in this method. For example, the patent document 1 (Japanese Published Patent Application No. H11-39293) discloses a technique of automatically extracting a document processed in the current task from among the contents of the tasks of a user, recording the task name and the person in charge of the task, and the document name, thereby searching the document using the recorded meta-data.

b. Generating an index of an information group

It is a technique of classifying plural pieces of information into information groups using predetermined reference numbers and generating an index for each piece of information as disclosed by, for example, the patent document 2 (Japanese Published Patent Application No. H11-143912). An index is generated by extracting a keyword, a document title, etc. from an information group. During the search, an information group is compared with a query, and an information group satisfying a search feature information is returned. Information which does not match the query, but is included in the information group can be searched.

FIG. 1 shows the outline of the conventional apparatus to which the technique b above is applied. As shown in FIG. 1, the conventional apparatus includes a computer (PC) 101 which is used by a user to perform a task and is provided with an information group detection unit 102, an information group database (hereinafter also referred to as an "information group DB") 103, an index generation unit 104, and an index record unit 105. The information group detection unit 102 classifies the information that is recorded in an information record unit 106 provided inside or outside the PC 101, and can be manipulated by a user into information groups based on the reference number predetermined for each piece of information, and records the data relating to the classified information group in the information group DB 103. The index generation unit 104 generates an index for each information group based on the data relating to the information group recorded in the information group DB 103. In generating an index, a keyword and a document title in the information group are extracted, thereby generating an index. A generated index is recorded in the index record unit 105, and is used in searching an information group.

In the technique a above, the user processes plural pieces of information in the operation. Although the user intends to collectively search the pieces of the information, the system does not prepare an index for each information group, and an information group cannot be searched. In the patent document 1, only meta-data such as a task name, the name of a person in charge, a document name, etc. is recorded and compared, and the contents of documents cannot be processed. Patent Document 1 uses only the sequence of manipulation histories in extracting a task, and no determination is made based on the contents, thereby possibly failing in extracting a task with sufficient accuracy. For example, when a user happens to start a task while performing another task, there can be the possibility that the currently processed information is recorded as the information processed in the other task.

In the technique b above, it is necessary to set in advance a reference number in each piece of information to generate an information group. Since the information without a reference number is not included in an information group, it is not to be searched. In addition, a reference number is fixed, and is not dynamically changed. Therefore, when the use (classifying method on an information group) of information by a user or a viewpoint of a user has changed, it is necessary to reproduce an index by reassigning a reference number. For example, when a user performs a routine task of processing plural pieces of information, the relationship between the pieces of information depends on the routine task. However, since the information group is fixed in the technique b above, there can be the possibility that no information group corresponding to the task exists although a user intends to search for the information on the basis of the task at a specific time point. Without an information group, its index is not existing, and no information relating to the task can be searched.

SUMMARY OF THE INVENTION

The present invention has been developed to solve the above-mentioned problems, and aims at providing a search index generation apparatus, a search index generating method, and a storage medium storing a search index generation program capable of generating an index (task index) for each information group processed in a task by automatically detecting a task of a user, and generating a task index of information groups of high similarity by comparing the similarities among the task indexes of the information groups.

To attain the above-mentioned objectives, the search index generation apparatus according to the first aspect of the present invention includes: an information manipulation monitor unit for monitoring information manipulation by a user using a computer and detecting the information manipulation performed by the user using the computer; an information manipulation database for accumulating data relating to the information manipulation detected by the information manipulation monitor unit; and a task detection unit for detecting a task of the user by analyzing the data relating to the information manipulation accumulated in the information manipulation database, identifying an information group processed in the task, and recording the data relating to the task in a task database.

With the apparatus, the task performed by the user can be automatically detected, and the information group processed in the task can be specified.

The search index generation apparatus according to the second aspect of the present invention is based on the first aspect, and further includes an inter-task similarity analysis unit for comparing similarities of tasks using the data relating to tasks accumulated in the task database, detecting tasks similar in contents, and recording the data relating to a task obtained by grouping tasks similar in contents in the task database. With the apparatus, the similarities can be compared among tasks, and the tasks having similar contents can be detected.

The search index generation apparatus according to the third aspect of the present invention is based on the second aspect, and further includes a task index generation unit for acquiring the data relating to the tasks accumulated in the task database, and generating a search index of an information group processed in each task.

With the apparatus, a search index of an information group processed in each task can be generated. Therefore, a search index can be generated by dynamically detecting a task without a preliminary reference number. Furthermore, since a search index can be generated for an information group about a task detected on the basis of daily information manipulations, the information can be searched on the basis of the tasks (using the memory of a user at the time of the task) performed in the past by the user. In addition, the apparatus can also compare the similarities among the tasks, detect the tasks having similar contents among the tasks, generate a large task containing the tasks having similar contents, and generate a search index of information groups processed in the large task.

The present invention is not limited to the search index generation apparatus, but can be constituted as a search index generating method, or a computer-readable storage medium storing a search index generation program.

BRIEF DESCRIPTION OF THE DRAWINGS

FIG. 2 shows the outline of the search index generation apparatus according to a mode for embodying the present invention;

FIG. 4 is a flowchart of the operation of the information manipulation monitor unit;

FIG. 5 shows an example of the data relating to the information manipulation recorded in the information manipulation DB in the operation of the information manipulation monitor unit;

FIG. 8 shows an example of the data relating to the information manipulation recorded in the information manipulation DB;

FIG. 9 is a flowchart of the task analysis performed using the method of detecting a task by discriminating the process flow of the information manipulation;

FIG. 10 shows an example of the data relating to an information manipulation recorded in the information manipulation DB;

FIG. 12A shows an example of the data relating to an information manipulation recorded in the information manipulation DB;

FIG. 12B shows the contents of the manipulation target table before the manipulation ID (0009) is recorded in the information manipulation DB;

FIG. 12C shows the contents of the manipulation target table after the manipulation ID (0009) is recorded in the information manipulation DB;

FIG. 14 is a flowchart showing the case in which a task analysis is performed using a method of detecting a task using the similarity of the information processed by a user after an information manipulation is segmented at a predetermined time interval;

FIG. 15A shows an example of the data relating to the information manipulation recorded in the information manipulation DB;

FIG. 15B shows the contents of the manipulation target table before the manipulation ID (0012) is recorded in the information manipulation DB;

FIG. 15C shows the contents of the manipulation target table after the manipulation ID (0012) is recorded in the information manipulation DB;

FIG. 17A shows an example of the data relating to the information manipulation recorded in the information manipulation DB;

FIG. 17B shows the contents of the manipulation target table before the manipulation ID (0013) is recorded in the information manipulation DB;

FIG. 17C shows the contents of the manipulation target table after the manipulation ID (0013) is recorded in the information manipulation DB;

FIG. 19 shows the recorded or updated contents of the task DB 5;

FIG. 21 shows an example of the contents recorded in the task DB after the operation of the inter-task similarity analysis unit is performed;

FIG. 23A is a first view showing an example of a task index recorded in the task index record unit in the operation of the task index generation unit;

FIG. 23B is a second view showing an example of a task index recorded in the task index record unit in the operation of the task index generation unit;

DESCRIPTION OF THE PREFERRED EMBODIMENT

Figure 1:
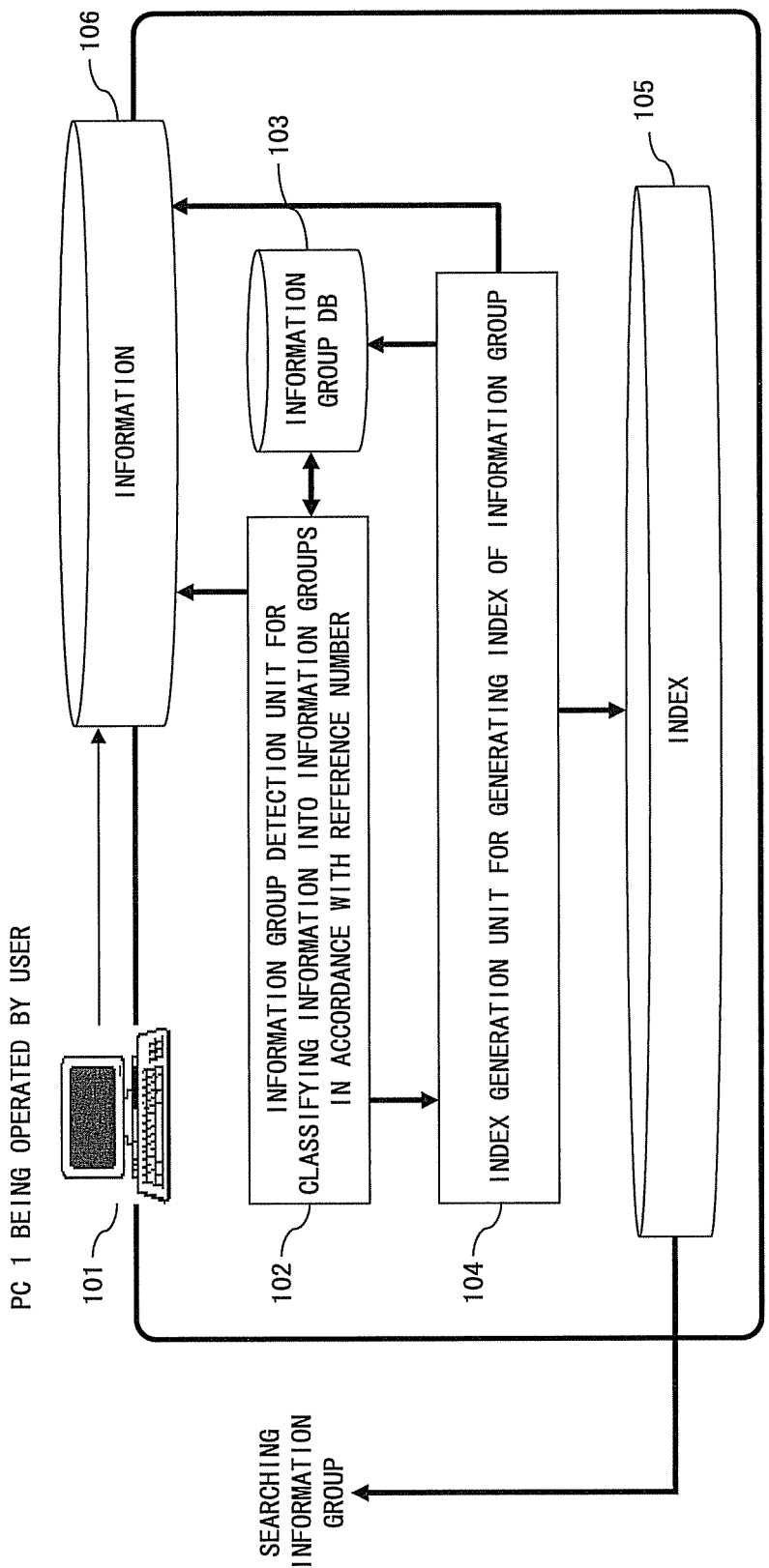
FIG. 1 shows the outline of the conventional apparatus for generating an index of an information group.

A mode for embodying the present invention is explained below by referring to the attached drawings.

FIG. 2 shows the outline of the search index generation apparatus in accordance with a mode for embodying the present invention.

In FIG. 2, a computer (PC) 1 is a computer allowing a user to perform an operation, and is provided with an search index generation apparatus including an information manipulation monitor unit 2, an information manipulation database (hereinafter referred to simply as an "information manipulation DB") 3, a task detection unit 4, a task database (hereinafter referred to simply as a "task DB") 5, an inter-task similarity analysis unit 6, a task index generation unit 7, and a task index record unit 8. Additionally, the PC 1 is also connected to one or more devices (for example, other computers (PCs), file server, etc.) over a network although the drawings are omitted here.

In this mode for embodying the present invention, the PC 1 is provided with a search index generation apparatus, but another configuration, for example, a plurality of devices (a plurality of computers or other devices) connected over a network, can be provided with the components of the search index generation apparatus in a distributed manner.

An information record unit 9 is a record unit that records the information from the computer 1, can be used in information manipulation by a user, and exists inside, outside, or both inside and outside the PC 1.

As described later in detail, the search index generation apparatus provided for the computer 1 automatically detects a task of a user, extracts plural pieces of information (information group) processed in the task by the user, and generates an index of the information group by analyzing the information group. In the following descriptions, the index of the information group processed by the user is referred to as a "task index". The search index generation apparatus calculates the similarity of each task from a task index, and generates a task index of a large task obtained by grouping tasks of high similarities (tasks having similar operation contents) When a user searches information, the computer 1 compares the task indexes with a query to acquire a task index satisfying the search feature information, and returns the information group processed in the task.

In the search index generation apparatus, the information manipulation monitor unit 2 monitors the information manipulation (accessing, generating, and printing information, transmitting, receiving, and reading email, browsing a Web page, etc.) performed by the user using the computer, and detects the information manipulation performed by the user using the computer. When the information manipulation is detected, the data relating to the information manipulation such as the contents of the manipulation, the manipulation target, the manipulation date and time, etc. of the detected information manipulation is recorded in the information manipulation DB 3. Thus, all information manipulations performed by the user using the computer are accumulated in the information manipulation DB 3 so that the information manipulations of the user can be analyzed later by accessing to the information manipulation DB 3, and the process flow of the information processing by the user and the transition of the information processed by the user can be retrieved.

The task detection unit 4 accesses to the information manipulation DB 3 and analyzes the information manipulation of the user, and detects the task (from the beginning to the end of the task) of the user. The method of detecting a task can be detecting after dividing an information manipulation of a user at each predetermined time interval (for example, every tenth minute, every thirtieth minute, etc.), detecting after extracting a segmentation (for example, from the OPEN to the CLOSE of a file) of an information manipulation of a user, detecting after obtaining a change of the similarity between the information groups processed by the user, etc. There is also a method of detecting a task by analyzing the information manipulation of a user by combining the above-mentioned methods.

For example, in a method of detecting a task by using a change of the similarity of an information group, an information group processed by a user is mapped in a document space. The document space is a vector space. The information group corresponds to a vector in the vector space. Each element of the vector corresponds to a keyword included in the information group or an attribute of the information group. The value of an element can be a frequency of a keyword or an attribute. The task detection unit 4 maps an information group for each predetermined segment, for example, in an information manipulation of a user, at a predetermined time interval, etc., in a document space. At this time, the angle, an inner product, etc. of the vector of the information group mapped in the document space and the vector at the previous mapping are obtained to acquire the similarity of the information processed by the user. Since a large change in similarity means a large change in information group processed by the user, it is estimated that the task has been changed, and the task is detected.

When the task detection unit 4 detects the task, the information group processed by the user in the detected task is identified, and the data relating to the detected task is recorded in the task DB 5.

The inter-task similarity analysis unit 6 retrieves the data relating to the task by accessing to the task DB 5, and compares the similarity of each task. The similarity of a task is obtained by acquiring the task index (task index generated by the task index generation unit 7 described later and recorded in the task index record unit 8) of each task, and the contents are compared. A method of comparing the contents of a task index can be, for example, a method of comparing the contents by mapping the task index of each task in a document space. In this method, the angle and the inner product of the vectors of the task indexes mapped in the document space are obtained. Thus, the similarity between tasks can be obtained. A high degree of similarity indicates that the user has performed tasks in which similar information groups are processed. Therefore, it is determined that the tasks are similar to one another, and the tasks are grouped into one large task and the data about the grouped tasks is recorded in the task DB 5.

By recursively calling the inter-task similarity analysis unit 6, tasks of various levels, that is, tasks from an individual small task to a large task generated by grouping a plurality of tasks, are detected, and its task index can be generated.

The task index generation unit 7 extracts an information group processed in the task detected by the task detection unit 4 and the inter-task similarity analysis unit 6 and generates a task index of the information group. The task index generated by the task index generation unit 7 is recorded in the task index record unit 8.

The task index generated as described above and recorded by the task index record unit 8 is compared with the query by the computer 1 when the user searches information, a task index satisfying the search feature information is acquired, and the information group processed in the task is returned.

Figure 3:
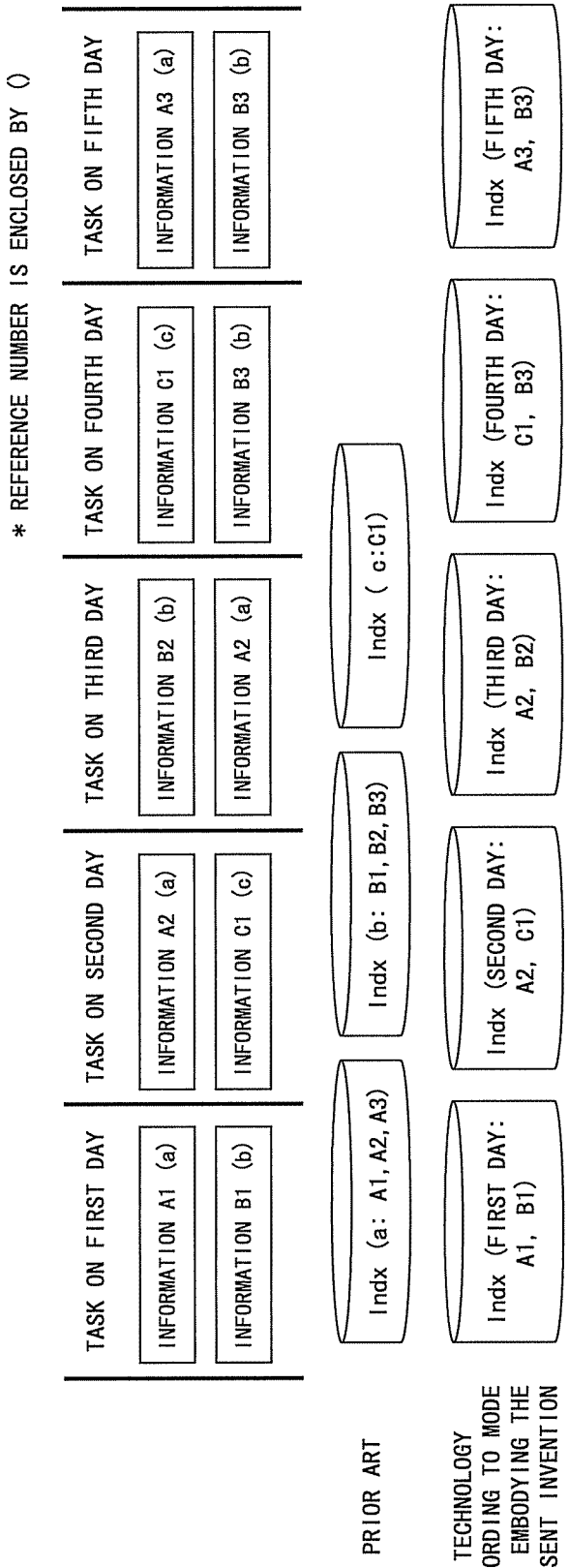
FIG. 3 shows an example of a task index generated by the search index generation apparatus according to a mode for embodying the present invention in comparison with a conventional apparatus.

FIG. 3 shows an example of a task index generated by the search index generation apparatus according to the mode for embodying the present invention in comparison with a conventional apparatus (FIG. 1).

In FIG. 3, the upper portion shows the information processed by the user in each task on the first through fifth days, the middle portion shows an example of the index generated by the conventional device, and the lower portion shows an example of a task index generated by the device according to the mode for embodying the present invention. The lowercase alphabetic characters enclosed by ( ) in each piece of information in the upper portion indicate the respectively predetermined reference numbers.

In this case, the conventional device obtains an information group using a reference number assigned to each piece of information regardless of the task performed by a user, and then an index is generated for each information group. Therefore, in the example shown in FIG. 3, since the information A1, A2, and A3 are set with the reference number a, the information B1 and B2 are set with the reference number b, and the information C1 is set with the reference number c, each information group is set with the assigned reference number, and each index is generated. However, it is possible for a user to process the information relating to a task in a routine regardless of a predetermined reference number. The user memorizes information processed in each task, but an index generated regardless of the task performed by the user. Therefore, when the index is used, search cannot be performed in accordance with the memory of the user.

On the other hand, the device according to the mode for embodying the present invention generates a task index by retrieving the information processed for each task in a routine. Therefore, a task index corresponding to the task in user memory can be generated, and the search can be performed in accordance with the user memory. In the example shown in FIG. 3, the number of days (day unit) is used when a task is detected. A task is not limited to this, but can be detected in various methods as described later in detail.

Described below in detail for each component is the operation of the search index generation apparatus according to the mode for embodying the present invention.

First, the operation of the information manipulation monitor unit 2 is explained below in detail by referring to FIGS. 4 and 5.

The information manipulation monitor unit 2 monitors various operations relating to information, detects an operation performed by a user, and records the detected operation in the information manipulation DB 3. In monitoring the operation, the operations of all information processed by the user using a computer is monitored. Various types of information, for example, a file, an email, an address list, a schedule list, pictures, music, etc. can be a target for an operation to be monitored. An operation to be monitored can be opening, closing, reading, writing, printing, copying, moving information, focusing, maximizing, and minimizing the window in which the information is displayed, and other operations, and can be detected.

FIG. 4 is a flowchart showing the operation of the information manipulation monitor unit 2.

As shown in FIG. 4, the information manipulation monitor unit 2 first judges whether or not software to be monitored is operating (being executed) on a computer to be monitored (S1). When the judgment result is NO, the process flow terminates.

When the judgment result is YES, it is judged whether or not an information manipulation is performed by a user through the software to be monitored (S2). When the judgment result is NO, control is returned to S1.

When the judgment result in S2 is YES, then it is judged whether or not the information manipulation performed in S2 is the information manipulation to be monitored (S3). When the judgment result is NO, control is returned to S1.

When the judgment result in S3 is YES, the data about the information manipulation performed in S2 is recorded in the information manipulation DB 3 (S4), and control is returned to S1.

FIG. 5 shows an example of the data about the information manipulation recorded in the information manipulation DB 3 in the operation of the information manipulation monitor unit 2 shown in FIG. 4.

As shown in FIG. 5, the information manipulation DB 3 stores for each detected information manipulation an manipulation ID ("manipulation ID") uniquely assigned to the information manipulation, the date and time ("date" and "time") on which the information manipulation is performed, contents of the information manipulation ("manipulation"), the manipulation target ("manipulation target") of the information manipulation, the manipulation details ("manipulation details") recorded as necessary, the user name ("user") of the user who performs the information manipulation, and the computer name ("PC name") of the computer used when the information manipulation is performed.

Next, the operation of the task detection unit 4 is explained in detail by referring to FIGS. 6 through 19.

The task detection unit 4 checks the presence/absence of a new information manipulation by accessing to the information manipulation DB 3. When there is a new information manipulation detected, a task analysis is performed to detect a task, the information group processed in the task is identified, and the information about the detected task is recorded (stored) in the task DB 5.

A method of the task detection unit 4 detecting the presence/absence of a new information manipulation can be a method by the task detection unit 4 periodically accessing to the information manipulation DB 3, or by the information manipulation monitor unit 2 recording (storing) data about an information manipulation in the information manipulation DB 3 (S4 shown in FIG. 4) and notifying the task detection unit 4 of the record.

Figure 6:
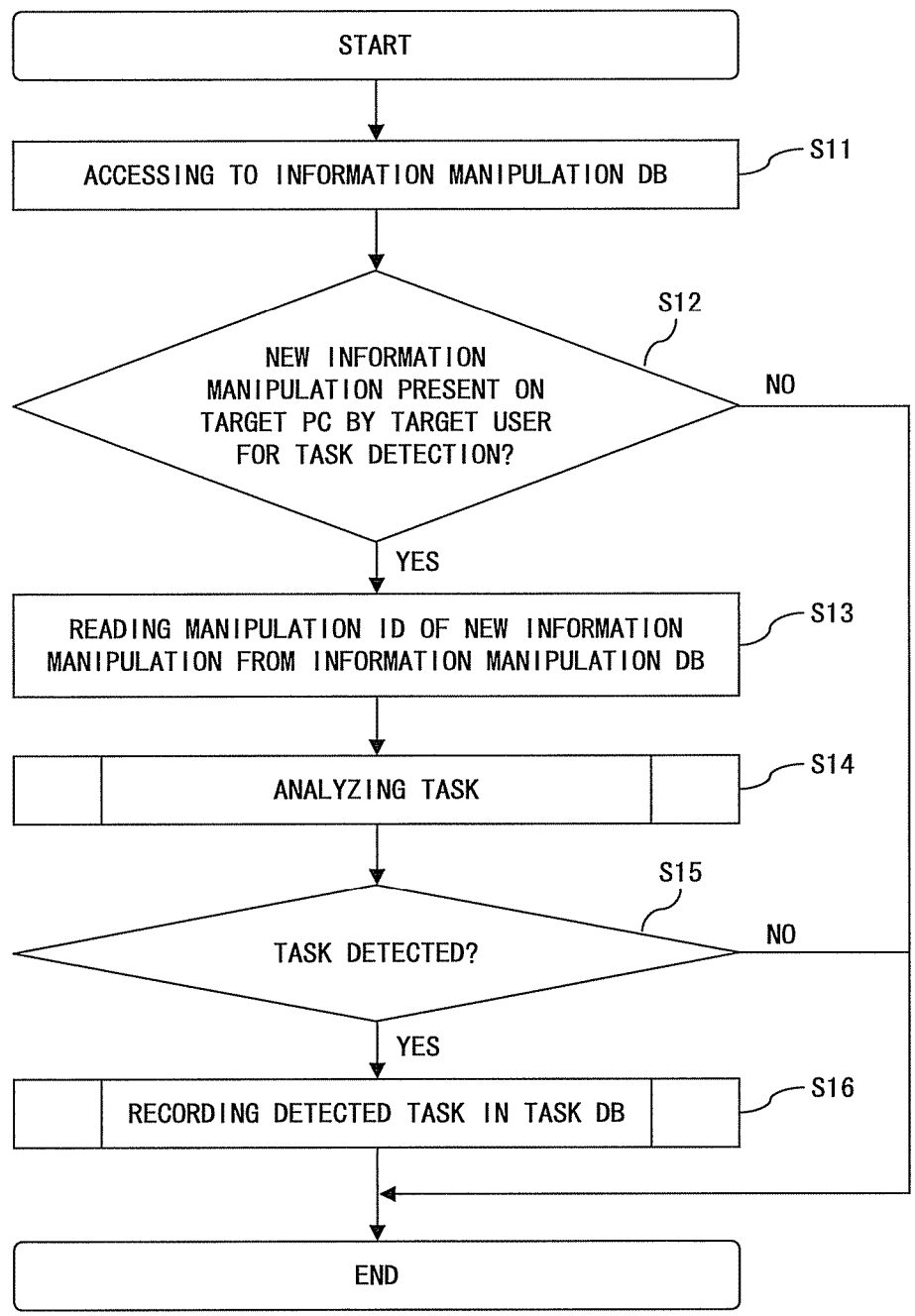
FIG. 6 is a flowchart of the operation of the task detection unit.

FIG. 6 is a flowchart of the operation of the task detection unit 4.

As shown in FIG. 6, the task detection unit 4 first accesses to the information manipulation DB 3 (S11).

Then, it judges whether or not the data of a new information manipulation has been recorded in the accessed information manipulation DB 3 on the target computer (target PC) by the target user in detecting a task (S12). When the judgment result is NO, the process flow terminates.

When the judgment result is YES, the manipulation ID of the latest information manipulation is read from the information manipulation DB 3 (S13).

Then, as described later in detail by referring to FIGS. 7 through 17, a task (from the beginning to the end of a task) is detected by performing a task analysis in accordance with the manipulation ID read in S13 (S14). In the task analysis, the analysis of the information manipulation about a user is continued in the method described later until the detection of the end of the task after detecting the start of a task.

Then, it judges whether or not the task is detected in S14 (S15). If the judgment result is NO, the process flow terminates.

If the judgment result is YES, as described later in detail by referring to FIGS. 18 and 19, the information group processed in the detected task is identified, the data about the detected task is recorded (stored) in the task DB 5 (S16), thereby terminating the process flow. However, in S16, if the data about the detected task has already been recorded, the contents of the task DB 5 are updated.

The task analysis in S14 and the record in the task DB 5 (or update the task DB 5) in S16 are explained further in detail.

First, the task analysis in S14 is explained.

The task analysis is performed in the following methods.

(1) A method of detecting a task by segmenting an information manipulation at predetermined time intervals (2) A method of detecting a task by discriminating the process flow of an information manipulation (3) A method of detecting a task by comparing the similarity between the information group (plural pieces of information) processed in an information manipulation (4) A method of detecting a task by combining the methods above The task analysis in each of the methods (1) through (4) is explained below in order.

First, the task analysis in the method (1) above is explained below by referring to FIGS. 7 and 8.

Figure 7:
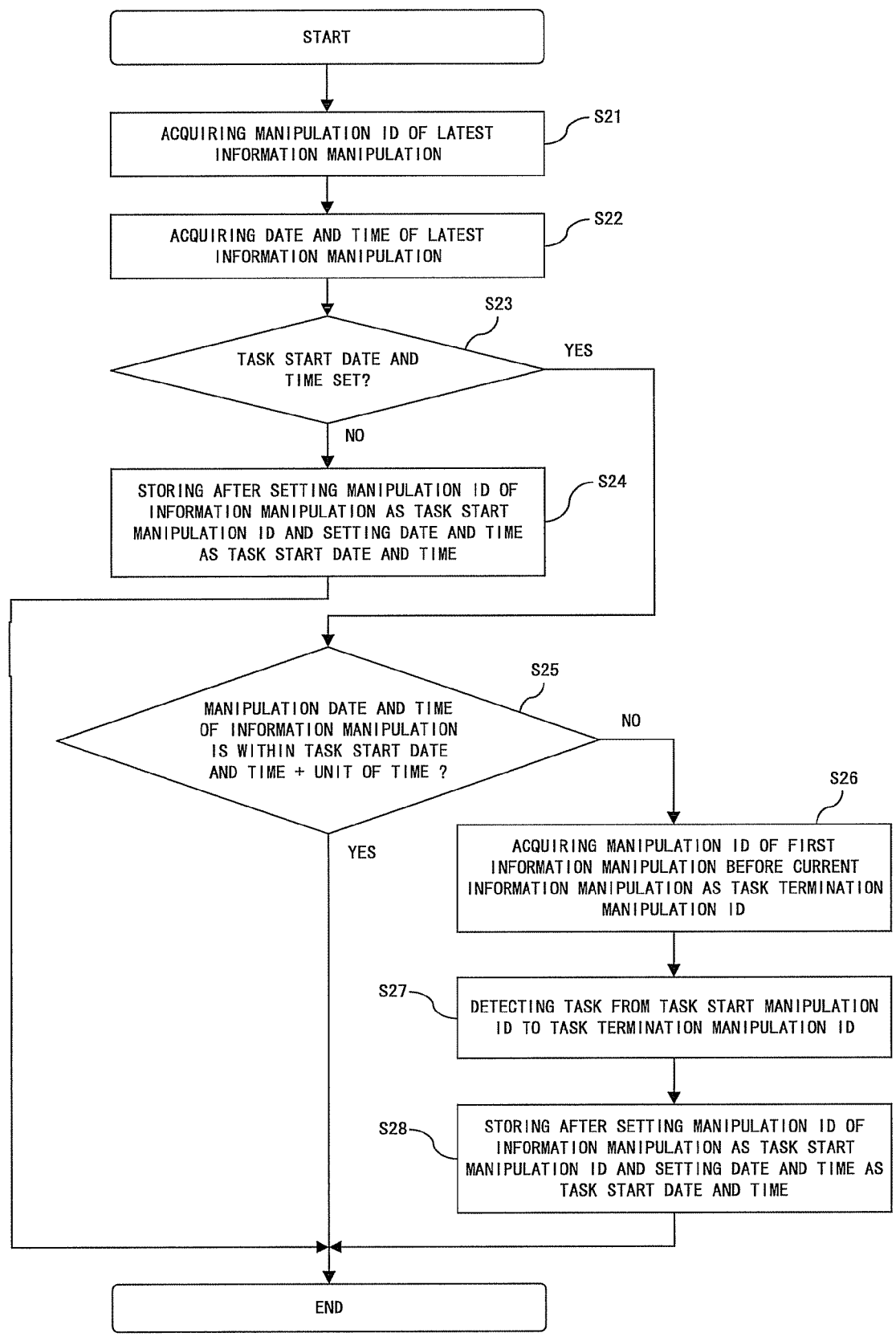
FIG. 7 is a flowchart of the task analysis performed using the method of detecting a task by segmenting an information manipulation for each predetermined time interval.

FIG. 7 is a flowchart used when a task analysis is performed in the method (1) above.

In this case, as shown in FIG. 7, the task detection unit 4 first acquires the manipulation ID of the latest information manipulation read from the information manipulation DB 3 in S13 shown in FIG. 6 (S21).

Then, the date and time of the latest information manipulation is acquired (S22).

Then, it is judged whether or not the task starting date and time has been set (S23).

If the judgment result is NO in the judgment in S23, the manipulation ID acquired in S21 and the date and time acquired in S22 are set as the task starting manipulation ID and the task starting date and time, and stored in the internal RAM (random access memory), etc. (S24), thereby terminating the flowchart.

If the judgment result in S23 is YES, it is judged whether or not the date and time acquired in S22 is within the date and time obtained by adding a predetermined time unit to the task start date and time (S25). A predetermined time unit refers to a predetermined time interval used when a task is detected by segmenting an information manipulation at a predetermined time interval, for example, a predetermined time interval such as 30 minutes, one hour, one day, one week, etc.

In the judgment in S25, when the judgment result is YES, the process flow terminates.

If the judgment result in S25 is NO, the manipulation ID of the first information manipulation before the information manipulation relating to the manipulation ID acquired in S21 is acquired as a task termination manipulation ID (S26).

Then, the information manipulations from the set task start manipulation ID to the task termination manipulation ID in S26 are detected as tasks (S27).

Then, the manipulation ID acquired in S21 and the date and time acquired in S22 are set as a task start manipulation ID and a task start date and time and stored in the internal RAM, etc (S28), thereby terminating the process flow.

A practical example of performing a task analysis in the method (1) is explained below by referring to FIG. 8.

FIG. 8 shows an example of the data of an information manipulation recorded in the information manipulation DB 3.

In this example, it is assumed that the information manipulation of the manipulation ID (0011) shown in FIG. 8 is the latest information manipulation, the predetermined time unit in the task analysis is one hour, and the manipulation ID (0008) is set as a task start manipulation ID.

In this case, the manipulation ID (0011) of the latest information manipulation is acquired, and the date and time (Sep/14/06 12:35 PM) of the information manipulation is acquired. Then, the date and time (Sep/14/06 11:20 AM) of the task start manipulation ID (0008) as a set task start date and time is acquired. Then, it is judged whether or not the manipulation date and time (Sep/14/06 12:35 PM) of the information manipulation relating to the manipulation ID (0011) is within the date and time (Sep/14/06 12:20 PM) obtained by adding a predetermined time unit (1 hour) to the task start date and time (Sep/14/06 11:20 AM). In this example, since the judgment result is NO, the manipulation ID (0010) of the first information manipulation before the information manipulation relating to the manipulation ID (0011) is acquired as a task termination manipulation ID. Then, the information manipulations (black portion shown in FIG. 8) from the task start manipulation ID (0008) to the task termination manipulation ID (0010) are detected as tasks. Then, the manipulation ID (0011) and the date and time (Sep/14/06 12:35 PM) of the information manipulation are set as the task start manipulation ID and the task start date and time and stored in the internal RAM or other units.

In the task analysis in the method (1) above, in addition to the explained example, an information manipulation performed in each base unit such as a day-based unit (from 0:00 to 11:59 on the day), a week-based unit (from Sunday to Saturday), an hour-based unit (8:00 AM to 8:59 AM, 9:00 AM to 9:59 AM, . . . ), etc. can be detected as a task.

Thus, in the task analysis in the method (1) above, a task relating to not only the information being processed by a user but also a task relating to an information group processed in a constant span can be detected.

Then, the task analysis in the method (2) above is explained below by referring to FIGS. 9 and 10.

In the task analysis in the method (2), for example, it is considered that the same task is performed from opening a certain piece of information by a user to closing it. Therefore, a task is detected from the process flow of the information manipulations. When a user performs information manipulations for another piece of information, it is assumed that the information manipulations have been also performed on the same task and detected.

FIG. 9 is a flowchart of the task analysis performed in the method (2) above.

In this case, as shown in FIG. 9, the task detection unit 4 first acquires the manipulation ID (hereinafter also referred to simply as the "latest information manipulation ID") of the latest information manipulation read from the information manipulation DB 3 in S13 shown in FIG. 6, the manipulation (for example, OPEN, CLOSE, etc.) of the information manipulation (S31).

Then, it is judged whether or not the acquired manipulation relates to the start or termination of access to information (S32). When the judgment result is NO, the process flow terminates.

If the judgment result in S32 is YES, and the manipulation relates to the start of access to information, then it is judged whether or not there is the information being accessed to other than the information accessed to in the manipulation (S33). If the judgment result is YES, the process flow terminates. If the judgment result in S33 is NO, then the latest information manipulation ID acquired in S31 is set in the task start manipulation ID and stored in the internal RAM, etc. (S34), thereby terminating the process flow.

On the other hand, if the judgment result in S32 is YES, and the manipulation relates to the termination of the access to information, then it is judged whether or not there is information currently being accessed to other than the information the information whose access is to be terminated in this manipulation (S35). If the judgment result is YES, the process flow terminates. If the judgment result in S35 is NO, then the latest information manipulation ID acquired in S31 is set as the task termination manipulation ID (S36). Then, the information manipulation from the task start manipulation ID to the task termination manipulation ID is detected as tasks (S37), thereby terminating the process flow.

The practical example of performing a task analysis in the method (2) above is explained by referring to FIG. 10.

FIG. 10 shows an example of the data about the information manipulation recorded in the information manipulation DB 3.

In this example, the information manipulation of the manipulation ID (0011) shown in FIG. 10 is the latest information manipulation.

In this case, the manipulation ID (0011) is acquired as the latest information manipulation ID, and the manipulation (CLOSE) of the information manipulation is acquired. Then, since the manipulation (CLOSE) relates to the termination of access, and there is no information being accessed to at that time, the manipulation ID (0011) is set as the task termination manipulation ID.

Relating to the task start manipulation ID, the manipulation ID (0008) was acquired in the past as the latest information manipulation ID, and when the manipulation (OPEN) of the information manipulation is acquired, the manipulation (OPEN) relates to the start of access, and there is no other information being accessed to at the time. Therefore, the manipulation ID (0008) is set as a task start manipulation ID.

Therefore, when the manipulation ID (0011) is set as a task termination manipulation ID, the information manipulations (black portion shown in FIG. 10) from the task start manipulation ID (0008) to the task termination manipulation ID (0011) are detected as tasks.

In the task analysis performed in the method (2) above, a task corresponding to the flow of the information manipulation of the user can be detected.

Figure 11:
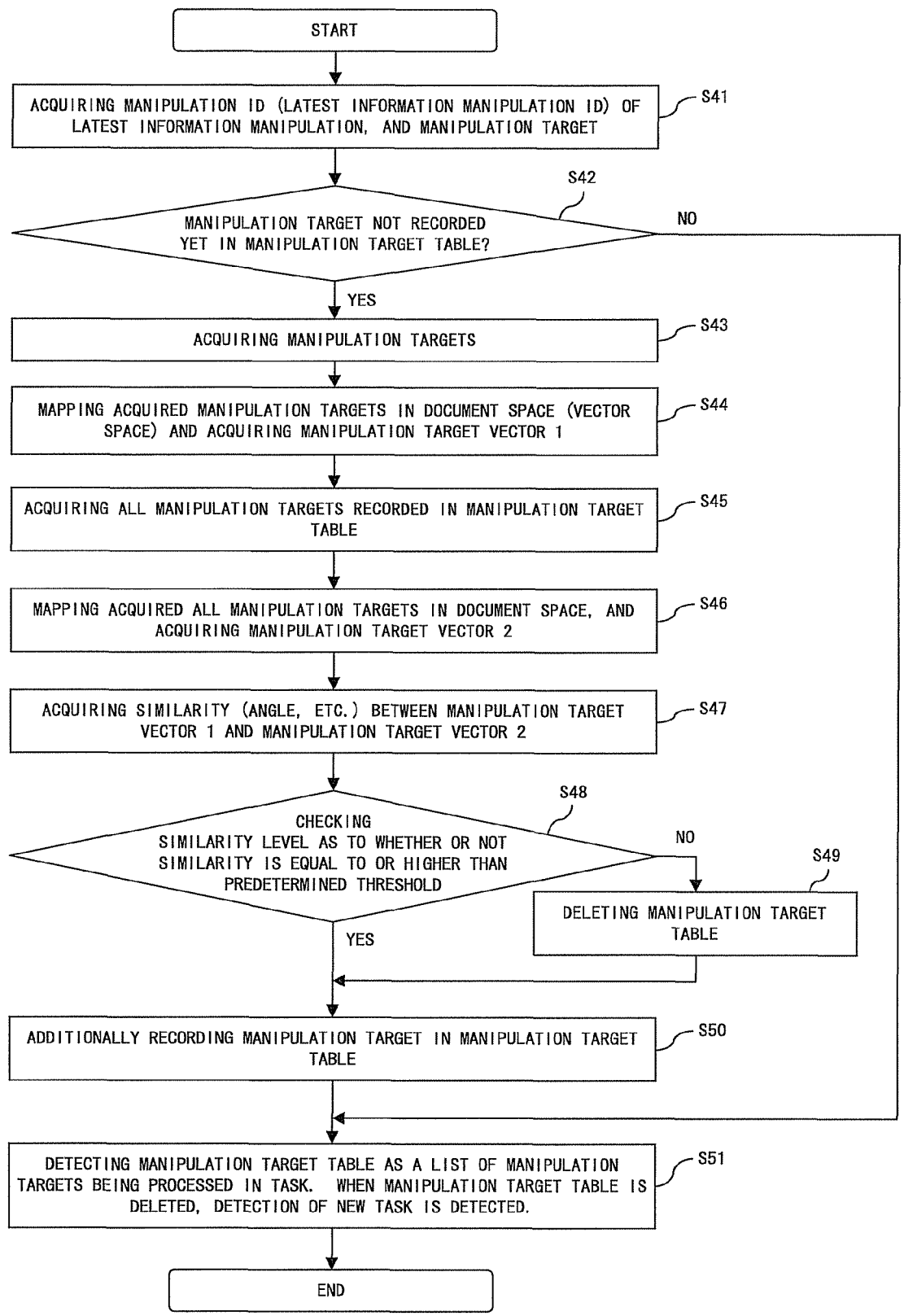
FIG. 11 is a flowchart of the task analysis using the method of detecting a task by comparing the similarities among the information groups (plural pieces of information) processed in the information manipulation.
Figure 13:
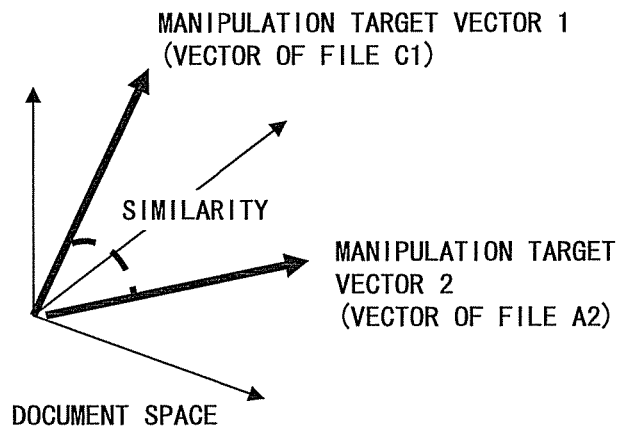
FIG. 13 shows an example of a document space in which an manipulation target is mapped.

Next, the task analysis performed in the method (3) above is explained by referring to FIGS. 11 through 13.

In the task analysis performed in the method (3) above, the task detection unit 4 maps the information group processed by a user in the information manipulation in a vector space. The element of each vector is the frequency of a keyword and an attribute included in information. The task detection unit 4 compares the vector sum of the information group processed in the preceding information manipulations with the vector of the information processed in the new information manipulation for similarity, and detects the task by referring to the difference between the compared values. When the similarity is high, it indicates that the user continues processing similar information. Therefore, it is determined that the task of the user continues, and the information processed in the new information manipulation is added to the manipulation target table of tasks. When the similarity is low, the contents of the information processed by the user have greatly changed. Therefore, it is assumed that the user has started a new task, a new manipulation target table is generated, and the information processed in the new information manipulation is recorded. The threshold for the similarity is predetermined. A generated manipulation target table is stored in the internal RAM or other units.

FIG. 11 is a flowchart of a task analysis performed in the method (3) above.

As shown in FIG. 11, in this case, the task detection unit 4 first acquires the manipulation ID of the latest information manipulation read from the information manipulation DB 3 in S13 shown in FIG. 6, and an manipulation target of the information manipulation (for example, a file A, a file B, etc.) (S41).

Then, it is judged whether or not the acquired manipulation target has not been recorded in the manipulation target table (S42). When the judgment result is NO, control is passed to S51.

On the other hand, when the judgment result is YES, the manipulation targets are acquired (S43), and the acquired the manipulation targets are mapped in the document space as a vector space, and a manipulation target vector 1 is acquired (S44).

Then, all manipulation targets recorded in the manipulation target table are acquired (S45), and the acquired all manipulation targets are mapped in the document space, and a manipulation target vector 2 is acquired (S46).

Then, the similarity between the manipulation target vector 1 and the manipulation target vector 2 (for example, an angle, an internal product, etc.) is acquired (S47). Then, the similarity between the vectors is judged in, for example, angle, internal product, etc., the level (high or low) of the similarity can be represented by a range from 0 to 1 and other values without using binary values such as 0, 1, etc.

Next, to compare the level of the similarity, it is judged whether or not the acquired similarity is equal to or higher than a predetermined threshold (S48). If the acquired similarity is equal to or higher than the predetermined threshold, it indicates high similarity. If it is lower than the predetermined threshold, it indicates low similarity. If the judgment result is NO, the manipulation target table is deleted (S49), thereby passing control to S50.

If the judgment result is YES in S48, the manipulation target acquired in S41 is additionally recorded in the manipulation target table (S50). If it is performed after S49, an manipulation target table is newly generated, and the manipulation target acquired in S41 is recorded in the table (S50).

After S50, or if the judgment result in S42 is NO, then the manipulation target table is detected as a list of manipulation targets being processed in the tasks (S51). Detecting a manipulation target table as a list of manipulation targets being processed in the tasks means that the tasks in which the manipulation targets recorded in the manipulation target table being processed have been detected.

In S51, if the manipulation target table is deleted in S49 and a manipulation target table is newly generated in S50, it (that the new task has also been detected) is also detected.

When the process in S51 is over, the process terminates.

A practical example of performing a task analysis in the method (3) above is explained below by referring to FIGS. 12A, 12B, 12C, and 13.

FIG. 12A shows an example of the data relating to the information manipulation recorded in the information manipulation DB 3. FIG. 12B shows the contents of the manipulation target table before the manipulation ID (0009) is recorded in the information manipulation DB 3. FIG. 12C shows the contents of the manipulation target table after the manipulation ID (0009) is recorded in the information manipulation DB 3. FIG. 13 shows an example of a document space in which a manipulation target is mapped. In the document space shown in FIG. 13, an element of a vector is the frequency of each word included in a manipulation target, and the similarity is the angle between the manipulation target vector 1 and the manipulation target vector 2.

In this example, the information manipulation of the manipulation ID (0009) shown in FIG. 12A is the latest information manipulation.

In this case, the manipulation ID (0009) is first acquired as the latest information manipulation ID, and then the manipulation target (file C1) are acquired. Next, the manipulation target (file C1) are mapped in the document space, and the manipulation target vector 1 (FIG. 13) is acquired.

Then, all manipulation targets (file A2) recorded in the manipulation target table (FIG. 12B) are acquired, the manipulation targets (file A2) are mapped in the vector space, and the manipulation target vector 2 (FIG. 13) is acquired.

Next, the similarity between the manipulation target vector 1 and the manipulation target vector 2 is acquired, and it is judged whether or not the value is equal to or higher than a threshold.

If it is judged that it is equal to or higher than the threshold, the manipulation target (file C1) of the latest information manipulation ID (0009) are added to the manipulation target table shown in FIG. 12B (FIG. 12C). Then, the manipulation target table (FIG. 12C) is detected as a list of manipulation targets being processed in the tasks.

In the task analysis performed in the method (3) above, the tasks corresponding to the contents of the information manipulation of a user can be detected.

Next, the task analysis performed in the method (4) above is explained below.

In this process, a task analysis performed in the method obtained by combining the methods (1) and (3) above and a task analysis performed in the method obtained by combining the methods (2) and (3) above are explained.

First, the task analysis performed in the method obtained by combining the methods (1) and (3) above is explained below by referring to FIGS. 14, 15A, 15B, and 15C.

In the task analysis performed by combining the methods (1) and (3) above, the task detection unit 4 segments an information manipulation at every predetermined time interval, and then detects a task using the similarity of the information processed by the user.

FIG. 14 is a flowchart of the case where a task analysis is performed in the method obtained by combining the methods (1) and (3) above.

In this case, as shown in FIG. 14, the task detection unit 4 first acquires the manipulation ID of the latest information manipulation read from the information manipulation DB 3 in S13 shown in FIG. 6 (S61).

Then, the date and time of the latest information manipulation are acquired (S62).

Then, the date and time obtained by subtracting a predetermined time unit in the task analysis from the date and time of the latest information manipulation acquired in S62 is acquired as the task start date and time (S63). A predetermined time unit refers to a constant time interval used in detecting a task by segmenting an information manipulation at a constant time interval. For example, it is a time interval predetermined as 30 minutes, an hour, a day, a week, etc.

Then, the manipulation ID of the first information manipulation is acquired as a task start manipulation ID at and after the task start date and time (S64).

Next, the manipulation targets from the task start manipulation ID acquired in S64 to the task termination manipulation ID acquired in S61 are acquired (S65).

Then, the manipulation targets acquired in S65 are mapped in the document space as a vector space, and the manipulation target vector 1 is acquired (S66).

In S67 through S70, since the processes similar to those in S45 through S49 shown in FIG. 11 are performed, the explanation is omitted here.

If the judgment result in S69 is YES, the manipulation target (manipulation target of the manipulation target vector 1) acquired in S65 is additionally recorded in the manipulation target table (S71). Otherwise, when it is performed after S70, a new manipulation target table is generated, and the manipulation target acquired in S65 is recorded in the table (S71).

Then, in and after S72, the processes similar to those in and after S51 shown in FIG. 11 are performed. Therefore, the explanation is omitted here.

A practical example of the case where a task analysis is performed using the method obtained by combining the methods (1) and (3) above is explained by referring to FIGS. 15A, 15B, and 15C.

FIG. 15A shows an example of the data of the information manipulation recorded in the information manipulation DB 3. FIG. 15B shows the contents of the manipulation target table before the manipulation ID (0012) is recorded in the information manipulation DB 3. FIG. 15C shows the contents of the manipulation target table after the manipulation ID (0012) is recorded in the information manipulation DB 3.

In this example, the information manipulation of the manipulation ID (0012) shown in FIG. 15A is the latest information manipulation, and the predetermined time unit in the task analysis is 30 minutes.

In this case, first, the manipulation ID (0012) of the latest information manipulation is acquired as a task termination manipulation ID, and the date and time (Sep/14/06 13:00 PM) of the information manipulation is acquired. Then, the date and time (Sep/14/06 12:30 PM) obtained by subtracting 30 minutes from the above-mentioned date and time is acquired as the task start date and time, and the manipulation ID (0011) of the first information manipulation is acquired on or after the task start date and time. Then, the manipulation targets (file A2, email D1) processed in the information manipulations from the task start manipulation ID (0011) to the task termination manipulation ID (0012) are acquired. Then, the acquired the manipulation targets are mapped in the document space, and the manipulation target vector 1 is acquired from the vector sum.

Then, all manipulation targets (file A2, file C1) recorded in the manipulation target table (FIG. 15B) are acquired, the manipulation targets (file A2, file C1) are mapped in the vector space, and the manipulation target vector 2 is acquired from the vector sum.

Then, the similarity between the manipulation target vector 1 and the manipulation target vector 2 (for example, the angle between them) is obtained, and it is judged whether or not the value is equal to or higher than a threshold.

In this judgment, if it is judged that the value is equal to or higher than the threshold, the manipulation targets (file A2, email D1) of the manipulation target vector 1 is additionally recorded in the manipulation target table shown in FIG. 15B (FIG. 15C). If the contents of the manipulation target overlap (in this example, the file A2 overlaps), an overwrite recording is made.

Then, the manipulation target table (FIG. 15C) is detected as a list of manipulation targets processed in a task.

In the task analysis in the method of combining (1) and (3), a user task can be detected with lower load than in the case of detecting the task of a user using the similarity of the information group only.

Next, the task analysis in the method obtained by combining (2) and (3) above is explained below by referring to FIGS. 16, 17A, 17B, and 17C.

In the task analysis using the method of combining (2) and (3) above, the task detection unit 4 first judges the flow of the information operation, and then a task is detected using the similarity of the information processed by the user.

Figure 16:
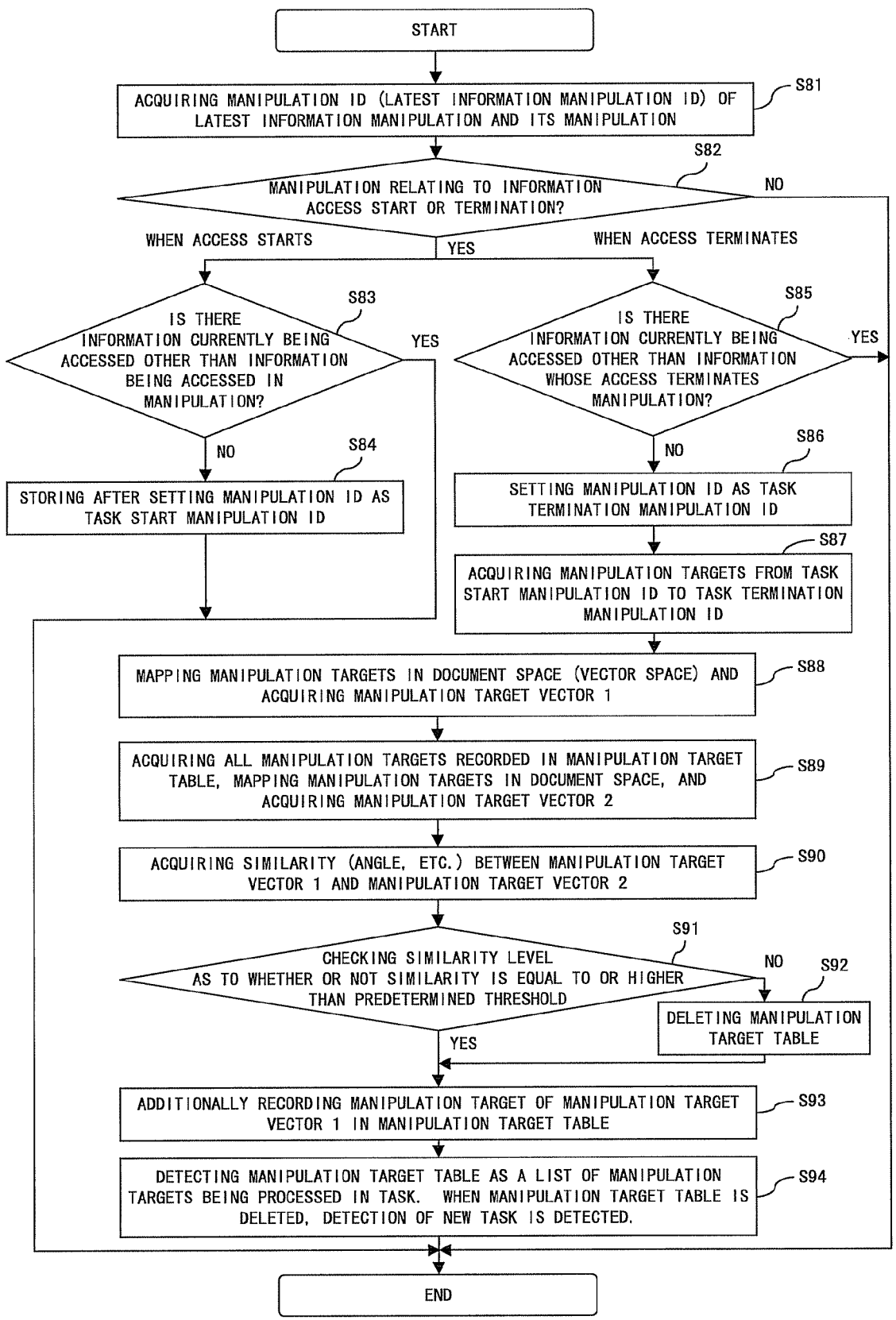
FIG. 16 is a flowchart of the case in which a task analysis is performed using a method of detecting a task using the similarity of the information processed by a user after the process flow of the information manipulation is discriminated.

FIG. 16 is a flowchart of the case in which a task analysis is performed in the method obtained by combining (2) and (3) above.

In FIG. 16, in S81 through S86, the process similar to the process in S31 through S36 shown in FIG. 9 is performed. Therefore, the explanation is omitted here.

When the process in S86 is completed, then the manipulation targets processed in the information manipulation from the task start manipulation ID to the task termination manipulation ID are acquired (S87), the acquired the manipulation targets are mapped in the document space as a vector space, and the manipulation target vector 1 is acquired (S88).

In the subsequent processes in and after S89, the processes similar to the processes in and after S67 shown in FIG. 14 are performed. Therefore, the explanation is omitted here.

A practical example in which a task analysis is performed using the method obtained by combining (2) and (3) above is explained below by referring to FIGS. 17A, 17B, and 17C.

FIG. 17A shows an example of the data relating to the information manipulation recorded in the information manipulation DB 3. FIG. 17B shows the contents of the manipulation target table before the manipulation ID (0013) is recorded in the information manipulation DB 3. FIG. 17C shows the contents of the manipulation target table after the manipulation ID (0013) is recorded in the information manipulation DB 3.

In this example, the information manipulation of the manipulation ID (0013) shown in FIG. 17A is the latest information manipulation.

In this case, the manipulation ID (0013) is acquired as the latest information manipulation ID, and the manipulation (CLOSE) of the information manipulation is acquired. Then, the manipulation (CLOSE) is the manipulation about the end of the access, and there is no other information being accessed. Therefore, the manipulation ID (0013) is set as the task termination manipulation ID.

As for the task start manipulation ID, the manipulation ID (0012) was acquired in the past as the latest information manipulation ID, and when the manipulation (OPEN) of the information manipulation is acquired, the manipulation (OPEN) relates to the start of the access, and there is no other information being accessed. Therefore, the manipulation ID (0012) is set as the task start manipulation ID.

Accordingly, when the manipulation ID (0013) is set as a task termination manipulation ID, the manipulation targets (email D1) processed in the information manipulations from the task start manipulation ID (0012) to the task termination manipulation ID ((0013) are acquired. Then, the acquired the manipulation targets (email D1) are mapped in the document space, and the manipulation target vector 1 is acquired.

Then, all manipulation targets (file A2, file C1) recorded in the manipulation target table (refer to FIG. 17B) are acquired, and the manipulation targets (file A2, file C1) are mapped in the vector space, and the manipulation target vector 2 is acquired from the vector sum.

Next, the similarity between the manipulation target vector 1 and the manipulation target vector 2 (for example, the angle between them) is acquired, and it is judged whether or not the value is equal to or higher than the threshold.

In the judgment, if it is judged that the value is equal to or higher than the threshold, the manipulation targets (email D1) of the manipulation target vector 1 are additionally recorded to the manipulation target table shown FIG. 17B (FIG. 17C)

Then, the manipulation target table (FIG. 17C) is detected as a list of manipulation targets processed in a task.

In the task analysis using the method obtained by combining (2) and (3) above, a user task can be detected with a lower load than in the case where a user task is detected using only the similarity of an information group. Even when an information group including different contents with the same manipulation purpose is processed, the detection is performed using the process flow of the information manipulations, thereby detecting a task with higher accuracy than when the detection is performed using only the information group.

Next, the recording in the task DB 5 (or updating the task DB 5) in S16 shown in FIG. 6 is explained below by referring to FIGS. 18 and 19.

Figure 18:
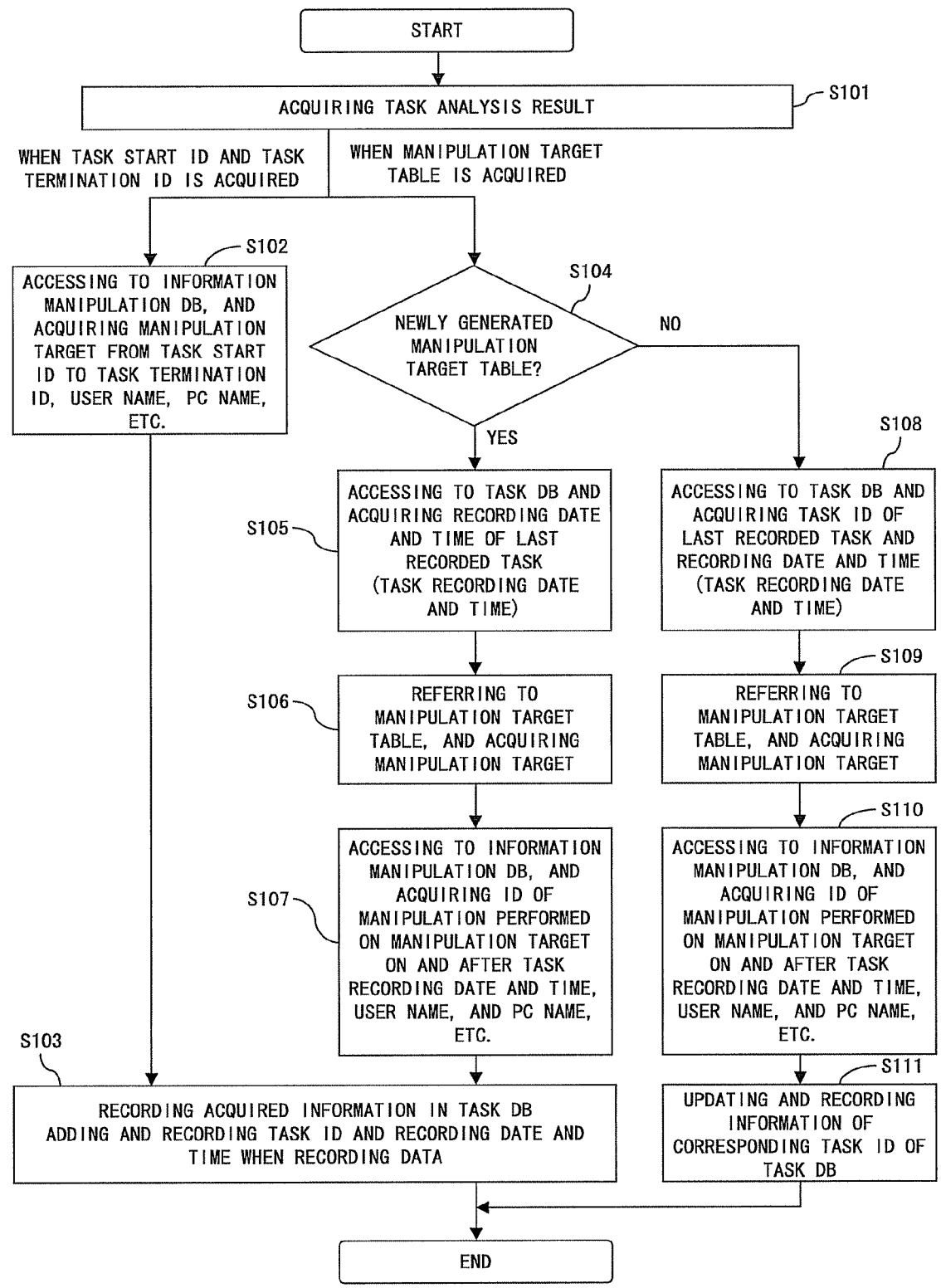
FIG. 18 is a flowchart of recording data in the task DB 5 (or updating the task DB 5)

FIG. 18 is a flowchart of recording in the task DB 5 (updating the task DB 5) in S16.

As shown in FIG. 18, the task detection unit 4 first acquires the result of a task analysis (S101). In S101, in the task analysis in S14 shown in FIG. 6, when the information manipulations from the task start manipulation ID to the task termination manipulation ID are detected as a task, the task start manipulation ID and the task termination manipulation ID are acquired as a task analysis result. If an manipulation target table is detected as a task in the task analysis in S14, the manipulation target table is acquired as a task analysis result. If an manipulation target table is detected, and a new task has been detected, the manipulation target table acquired as a task analysis result is acquired as a newly generated manipulation target table.

When the task start manipulation ID and the task termination manipulation ID are acquired in S101, the information manipulation DB 3 is accessed to, the manipulation target from the task start manipulation ID to the task termination manipulation ID, the user name, the PC name, etc. are acquired (S102), and the acquired information (data relating to the task) is recorded in the task DB 5 (S103). When the information is recorded, the task ID for unique identification of a task and a recording date and time (recording date and recording time) are added.

When an manipulation target table is acquired in S101, it is judged whether or not it is a newly generated manipulation target table (S104).

If the judgment result in S104 is YES, the task DB 5 is accessed to, and the last recorded task recording date and time (hereinafter referred to as a "task recording date and time") is acquired (S105). Then, the manipulation target table acquired in S101 is referred to, and the manipulation target is acquired (S106). Next, the information manipulation DB 3 is accessed to, the manipulation ID of the information manipulation performed on the manipulation target acquired in S106 on and after the task recording date and time acquired in S105, the user name, the PC name, etc. are acquired (S107), and the acquired information (data relating to the task) is recorded in the task DB 5 (S103).

If the judgment result in S104 is NO, the task DB 5 is accessed to, and the task ID and the task recording date and time of the last recorded task are acquired (S108). Then, the manipulation target table acquired in S101 is referred to, and the manipulation target is acquired (S109). Next, the information manipulation DB 3 is accessed to, the manipulation ID of the information manipulation performed on the manipulation target acquired in S109 on and after the task recording date and time acquired in S108, the user name, the PC name, etc. are acquired (S110). Then, the information about the task ID (task ID acquired in S108) of the task DB 5 is updated to reflect the information (data relating to the task) acquired in S110 in the task DB 5 (S111). In the update, the information about the task ID in the portion overlapping between the information acquired in S110 and the information about the task ID is overwritten by the information acquired in S110.

FIG. 19 shows the contents of the task DB 5 recorded or updated in the process flow shown in FIG. 18.

As shown in FIG. 19, the task DB 5 stores for each of the recorded tasks: a task ID ("task ID") uniquely determined for a corresponding task, a date and time ("recording date" and "recording time") on which the task is recorded, a target of an information manipulation ("manipulation target") as an information group processed in the task, a manipulation ID ("target manipulation ID ") of an information manipulation constituting the task, a user name ("user") who performed the task, a computer name ("PC name") used in the task, etc. The task ID is assigned when a task is newly recorded in the task DB 5. When the information about a recorded task in the task DB 5 is updated, the information about an old task is overwritten as described above.

Next, the operation of the inter-task similarity analysis unit 6 is explained below in detail by referring to FIGS. 20 and 21.

The inter-task similarity analysis unit 6 evaluates (analyzes) the similarity between tasks, and detects a large task obtained by grouping a plurality of tasks. If the frequency of an analysis performed by the inter-task similarity analysis unit 6 on a task is defined as the multiplicity of a task (hereinafter referred to as "task multiplicity"), the inter-task similarity analysis unit 6 analyzes the similarity between the tasks of the same task multiplicity.

Practically, the inter-task similarity analysis unit 6 first acquires a task of the same multiplicity by accessing to the task DB 5, and then maps and vectors each task in the document space as in the detection of a task using the similarity of the information by the task detection unit 4. When the inter-task similarity analysis unit 6 maps a task in the document space, it acquires the task index of the task (for more detail, the task index generated by the task index generation unit 7 described later and recorded by the task index record unit 8), and maps the task in the document space using the keyword included in the information group processed in the task and the frequency. The similarity between the tasks mapped in the document space is obtained by the angle, inner product, etc., and a new task is detected by grouping tasks of high similarities and recorded in the task DB 5. When a new task obtained by grouping a plurality of tasks and detected by the inter-task similarity analysis unit 6 is recorded in the task DB 5, a new task ID is assigned, and the task ID, the recording date and time, the multiplicity, and the task IDs of the grouped tasks are recorded. The multiplicity of a task is obtained by adding 1 to the multiplicity of a new task obtained by grouping a plurality of tasks. By repeating the process with the multiplicity varied, a large task obtained by grouping a plurality of small tasks can be detected. The inter-task similarity analysis unit 6 can terminate the process when the multiplicity of the task recorded in the task DB 5 reaches a predetermined maximum value or the number of tasks recorded in the task DB 5 reaches a predetermined maximum value.

Figure 20:
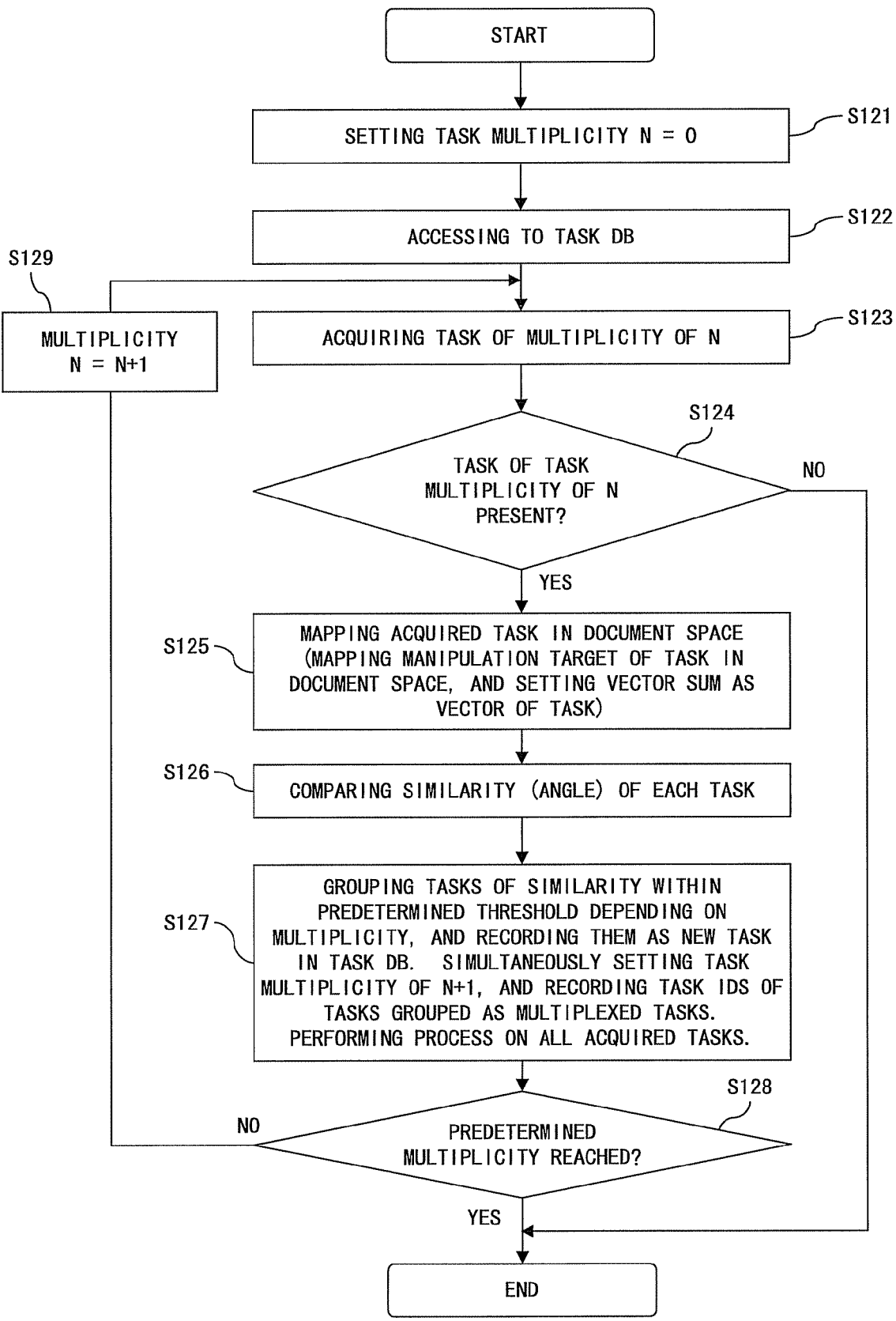
FIG. 20 is a flowchart of the operation of the inter-task similarity analysis unit.

FIG. 20 is a flowchart showing the operation of the inter-task similarity analysis unit 6.

As shown in FIG. 20, the inter-task similarity analysis unit 6 first sets the task multiplicity N=0 (S121).

Then, the task DB 5 is accessed to (S122), and the task of the task multiplicity N is obtained (S123).

Then, it is judged whether or not there is a task of the task multiplicity N (S124). If the judgment result is NO, the process flowchart terminates.

If the judgment result in S124 is YES, the acquired task is mapped in the document space (S125). In this mapping process, the manipulation target of the task is mapped in the document space, and the vector sum is set as a vector of the task.

In S125, when there is only one task acquired, it is not mapped in the document space, but the subsequent processes in steps S126 and 127 are omitted and control is passed to step S128 although not shown in the attached drawings.

After S125, the similarity (for example, an angle) of the vector of each task mapped in the document space is compared (S126). If the similarity of the vector of each task is, for example, an angle, an inner product, etc., the level of the similarity can be represented by a range, for example, from 0 to 1, not by binary values of 0 and 1, etc.

Then, as a result of the comparison in S126, a plurality of tasks within a predetermined threshold relating to the similarity in accordance with the multiplicity are grouped and recorded as a new task in the task DB 5 (S127). At this time, the task multiplicity N+1 and the task ID of the tasks grouped as a multiplexed task are recorded together. The process is performed on all tasks recorded in the task DB 5 as a new task.

Then, it is judged whether or not the value of the task multiplicity N has reached a predetermined multiplicity (S128). If the judgment result is YES, the process flow terminates.

When the judgment result in S128 is NO, the multiplicity N is set as N+1 (S129), and control is returned to S123.

A practical example of the case where the operation of the inter-task similarity analysis unit 6 is performed is explained by referring to FIG. 21.

In this example, the contents recorded in the task DB 5 before the operation of the inter-task similarity analysis unit 6 is performed are shown in FIG. 19. Although not shown in FIG. 19, each task of the task ID (0001), (0002), or (0003) is recorded in the task DB 5 with the task multiplicity of 0.

In this case, when the operation of the inter-task similarity analysis unit 6 is performed, the tasks of the task IDs (0001), (0002), and (0003) having the multiplicity of 0 are first acquired. The manipulation target of each task is mapped in the document space, the vector sum of the manipulation targets of each task is obtained, and the vector of the task is generated.

Then, the similarities of the vectors of tasks are compared, and a plurality of tasks of high similarities (within a threshold) are grouped and recorded as a new task in the task DB 5. In this example, as shown in FIG. 21, the tasks of the task IDs (0001) and (0002) are grouped as high similarity tasks, and recorded in the task DB 5 as a new task (task ID (0004)). At this time, the task multiplicity of 1 (0+1) of the task having the task ID (0004) is recorded, and the task IDs (0001) and (0002) of the grouped tasks are recorded as the multiplexed task ID. It is obvious that the recording date and time is recorded.

The process terminates here in this example. However, if there are a plurality of tasks having the same task multiplicity recorded in the task DB 5, the process is repeatedly performed until a predetermined task multiplicity is reached. However, even before the predetermined task multiplicity is reached, the process terminates if there are no tasks having the subsequent (N=N+1) task multiplicity.

In the operation of the inter-task similarity analysis unit 6, the tasks can be acquired in a hierarchical structure (small tasks→medium tasks→large tasks). Therefore, the tasks of the levels in accordance with the user's information needs (for example, a task in a day unit, a task of a week unit, a task of a month unit, a task of a year unit, etc.) can be acquired.

Next, the operation of the task index generation unit 7 is explained below by referring to FIGS. 22, 23A, and 23B.

The task index generation unit 7 accesses to the task DB 5, checks whether or not there is a task whose task index has not been generated, generates a task index if there is a task whose task index has not been generated, and records it in the task index record unit 8. When the task index is generated and recorded, an information group as a manipulation target of a task is acquired, the contents and the attribute of the information group are retrieved, the morphological analysis, n-gram, etc. of the retrieved contents is performed, the TF (term frequency), the IDF (inverted document frequency), etc. of each segmented element are calculated, and a combination of them is generated and recorded as a task index.

Figure 22:
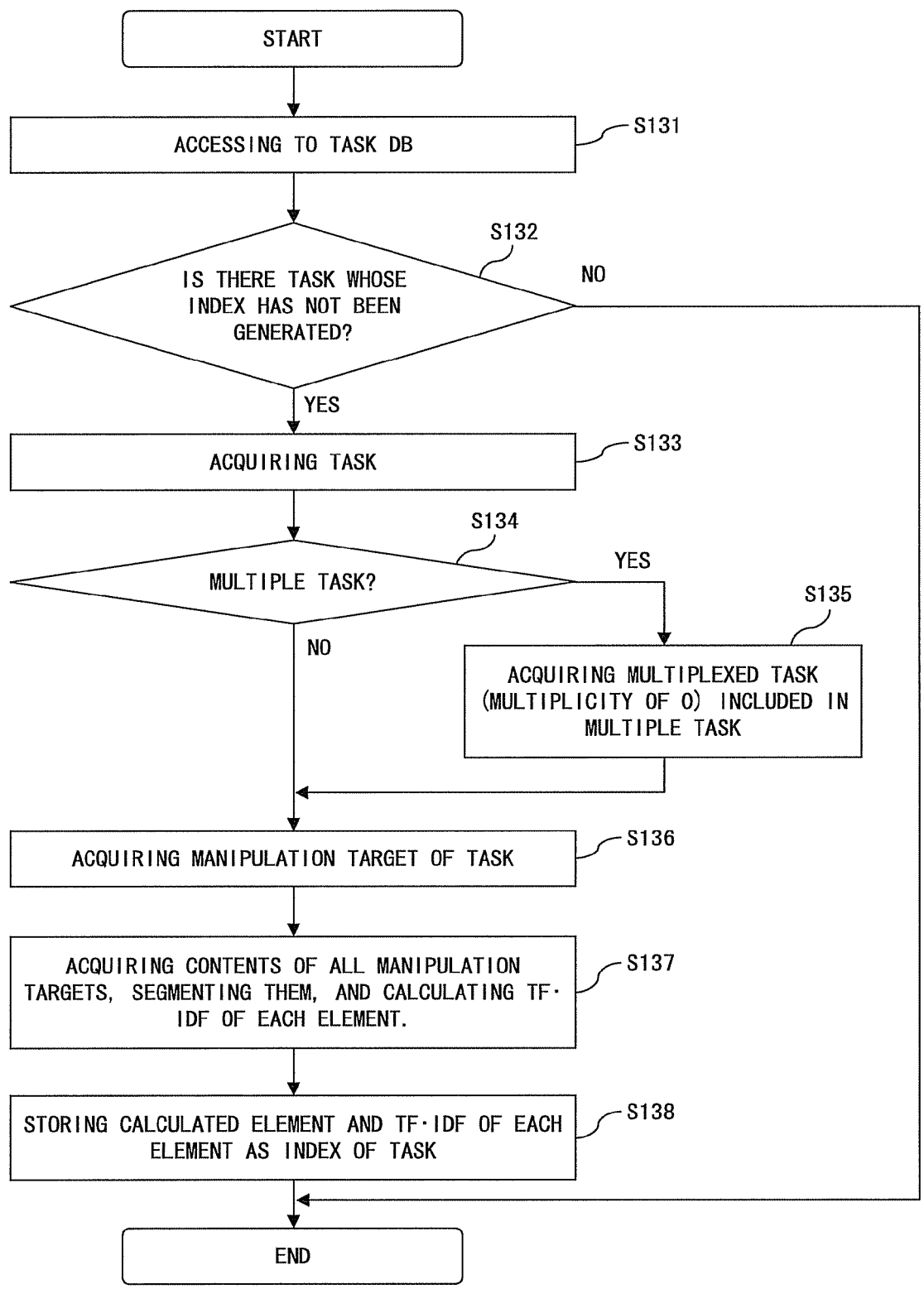
FIG. 22 is a flowchart of the operation performed by the task index generation unit.

FIG. 22 is a flowchart showing the operation of the task index generation unit 7. As shown in FIG. 22, the task index generation unit 7 first accesses to the task DB 5 (S131).

Then, it is judged whether or not there is a task whose task index has not been generated yet (S132). If the judgment result is NO, the process flow terminates.

If the judgment result is YES, a task whose task index has not been generated (data relating to the task) is acquired (S133).

Then, from the data relating to the task acquired in S133, it is judged whether or not the task whose task index has not been generated is a multiple task (S134).

If the judgment result in S134 is YES, the multiplexed tasks having the task multiplicity of 0 included in the multiple task (data relating to the multiplexed tasks) are acquired (S135), and from the data relating to the multiplexed tasks, all manipulation targets of the multiplexed tasks are acquired (S136).

If the judgment result in S134 is NO, all manipulation targets of the task are acquired from the data relating to the task acquired in S133 (S136).

Then, the contents of all acquired manipulation targets are acquired, the morphological analysis, n-gram, etc. of the contents is performed, and TF·IDF (product of TF and IDF) of each segmented element is calculated (S137).

Then, the segmented element and TF·IDF of each element are recorded on the task index record unit 8 as a task index of the task (S138), thereby terminating the process flow.

In the above-mentioned operation, the task index of the information group processed in the task is generated and recorded for each task.

The segmented element and TF·IDF of each element are also the information that characterizes a task and is extracted from an information group processed in the task. Therefore, using it as a task index, the task index can be generated using the contents memorized in association with the information group actually processed by the user in the task. In addition, by using as the information characterizing a task a keyword and an attribute as the segmented elements, the contents and the purpose of the task can be retrieved.

FIGS. 23A and 23B show an example of a task index recorded on the task index record unit 8 in the operation of the task index generation unit 7 shown in FIG. 22.

In the present example, as shown in FIGS. 23A and 23B, task indexes are divided and recorded in two tables. The table shown in FIG. 23A is an element table for storing a segmented element and an attribute of the contents of an information group. For more details, the element table stores an element, an attribute, an ID uniquely assigned to it, a DF (document frequency) indicating the number of manipulation targets that contains the element, a recording date and time, etc. The table shown in FIG. 23B is an element weight table indicating what elements and attributes are included in the manipulation targets processed in each task, and to what extent the element and the attribute are significant in search. For more details, the element weight table also records a task ID uniquely representing a task, an element ID uniquely indicating the element and the attribute included in the information group of the manipulation target processed in the task, a TF indicating the number of occurrences of the element of the element ID in the manipulation target processed in the task, the searched weight of the element ID (TF×Inverted DF), a recording date and time, etc. The search weight of an element can be, in accordance with a searching method, a binary (0: no occurrence, 1: occurrence of an element), a probability (occurrence probability of an element), etc.

In the above-mentioned operation of the task index generation unit 7, it is obviously possible to generate a task index for each task detected by the task detection unit 4, and it is also possible to generate a task index for each task in a hierarchical structure (small task→medium task→large task). Therefore, at the search of information, the computer 1 can retrieve an information group processed in the tasks of the levels in accordance with the user's information needs (for example, a task in a day unit, a task of a week unit, a task of a month unit, a task of a year unit, etc.) The operation of the computer 1 which searches information using a task index recorded in the task index record unit 8 is explained below by referring to FIG. 24.

Figure 24:
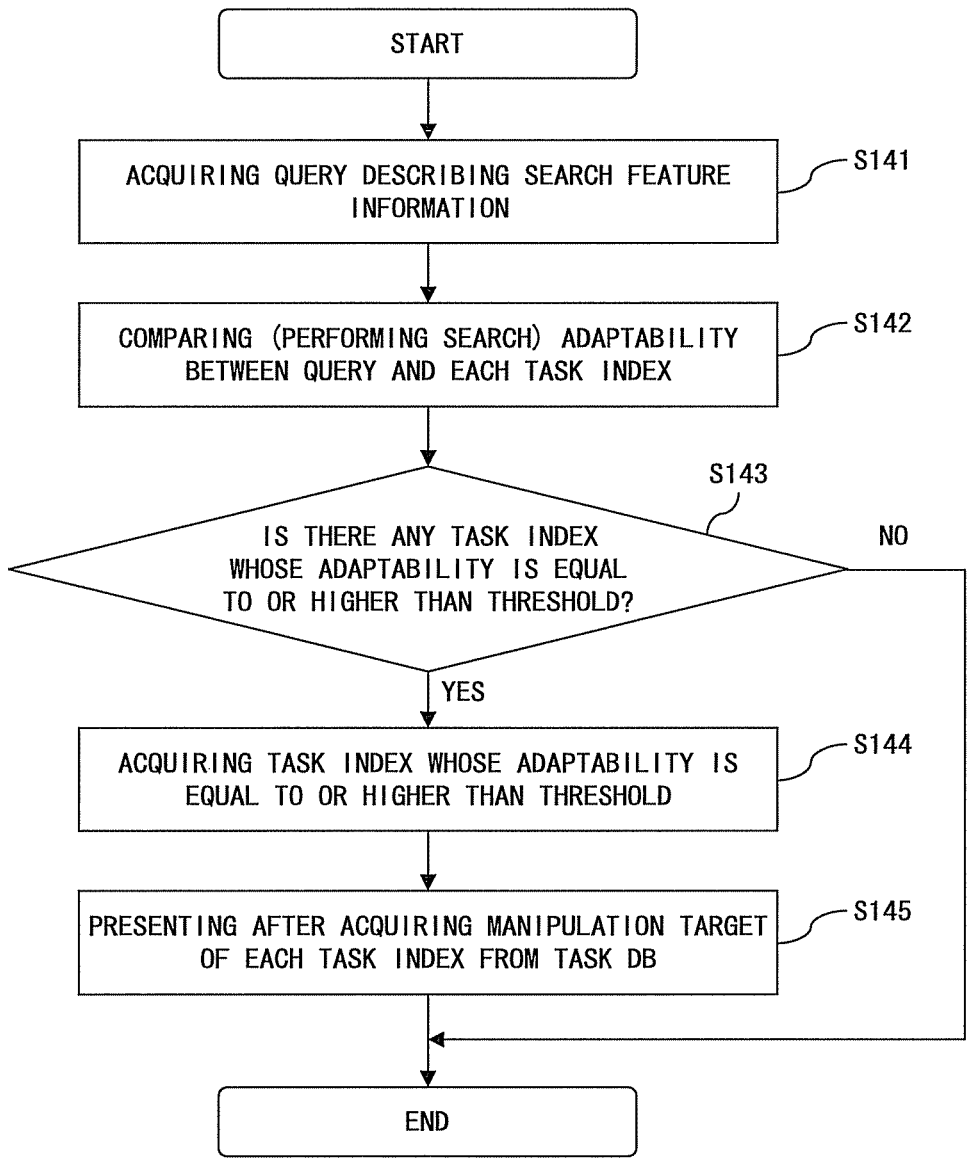
FIG. 24 is a flowchart of a computer searching an information group processed in a task using a task index recorded in the task index record unit.

FIG. 24 shows a flowchart of the computer 1 that searches an information group processed in a task using a task index recorded in the task index record unit 8.

As shown in FIG. 24, the computer 1 first acquires a query describing a search feature information (S141). The query can be a search feature information manually described by a user or a search feature information automatically described by the computer 1. The query is described in accordance with a searching method (for example, Boolean search, search using a vector space, etc.).

Then, the query acquired in S141 is compared in adaptability with the task index of each task recorded in the task index record unit 8 (S142). That is, the search is performed.

Next, as a result of the comparison in S142, it is judged whether or not the adaptability is equal to or higher than a predetermined threshold (S143). If the judgment result is NO, the process flow terminates.

If the judgment result in S143 is YES, a task index whose adaptability is equal to or higher than the predetermined threshold is acquired (S144).

Then, a task ID is acquired from the task index acquired in S144, the task DB 5 is accessed to, an information group processed in the task of the acquired task ID is acquired and presented (S145). That is, the manipulation target of the task index acquired in S144 is acquired from the task DB 5 and presented.

In S143 of the process flow, the method of judging the adaptability depends on the searching method. For example, when the searching method is Boolean search, the task whose element is specified in the search feature information is retrieved using a task index. Otherwise, for example, when a searching method is used with a vector space, the task whose element is specified in the search feature information is retrieved using a task index, and then the adaptability is checked as in the task analysis by the similarity of the information explained above by referring to FIG. 13 and the like. That is, the similarity between the vector obtained by mapping a search feature information in the document space and the vector obtained by mapping each task of the task index in the document space is checked, and a higher similarity task is acquired as a higher adaptability task.

As described above, with the search index generation apparatus according to the mode for embodying the present invention, it can automatically detect a task being performed by a user using a computer, an information group processed in each task is specified, and a task index can be generated from the information group. Therefore, a task index can be generated by dynamically detecting a task without assigning a preliminary reference number to information. Additionally, since a task index is generated for an information group processed in a task detected in a daily information manipulation, information can be searched using a task performed by the user in the past (using current memories).

Furthermore, by comparing the similarity between tasks, a task having similar contents can be detected, a plurality of tasks having similar contents are grouped into a large task, and a task index of an information group processed in the large task can be generated.

Figure 25:
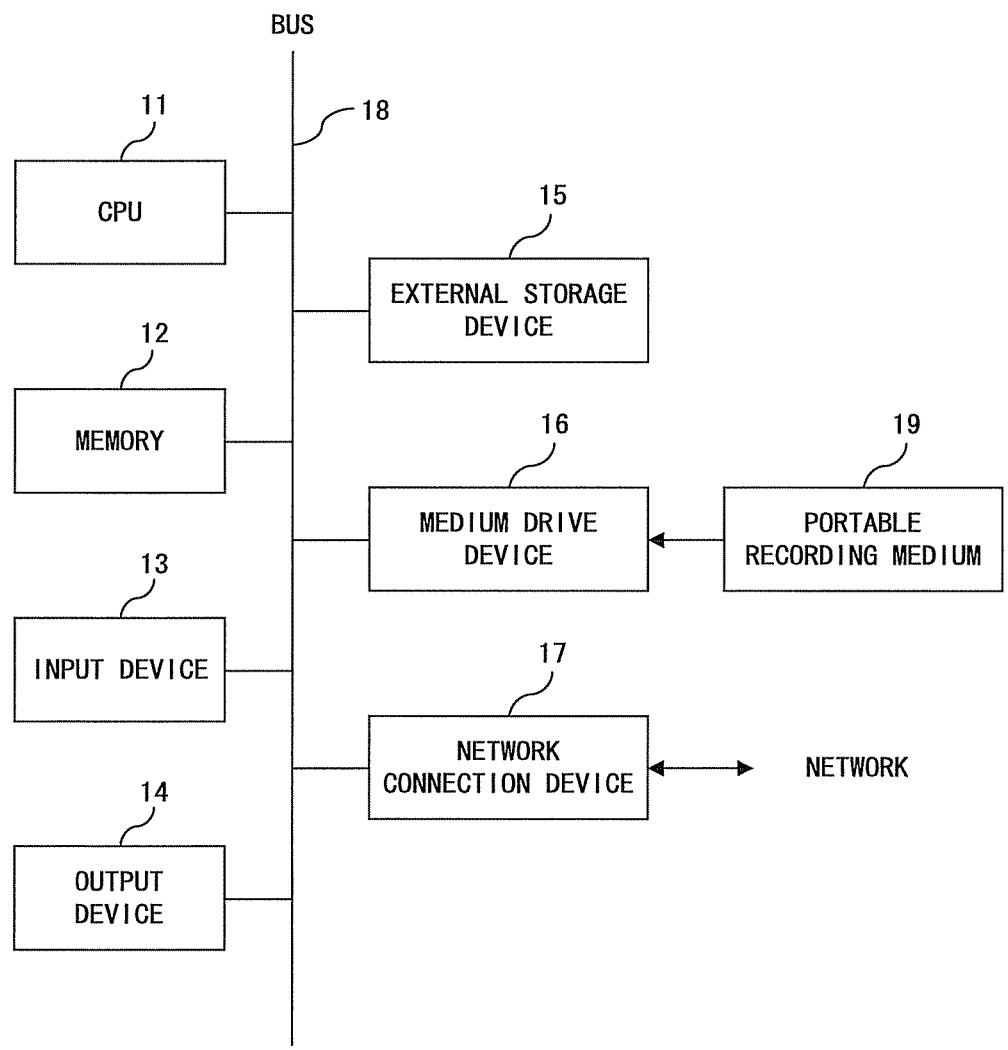
FIG. 25 shows the configuration of the information processing device.

The computer 1 provided with the search index generation apparatus shown in FIG. 2 is implemented on, for example, an information processing device (computer) as shown in FIG. 25.

The information processing device shown in FIG. 25 is provided with a CPU (central processing unit) 11, memory 12, an input device 13, an output device 14, an external storage device 15, a medium drive device 16, and a network connection device 17, and they are interconnected via a bus 18.

The memory 12 includes, for example, ROM (Read Only Memory), RAM, etc., and stores a program and data for use in processing. The CPU 11 performs a necessary process by executing the program using the memory 12.

The information manipulation monitor unit 2, the task detection unit 4, the inter-task similarity analysis unit 6, and the task index generation unit 7 shown in FIG. 2 correspond to the program stored in the memory 12 or its functions.

The input device 13 can be, for example, a keyboard, a pointing device, a touch panel, etc., and is used in inputting an instruction and information from a user. The output device 14 can be, for example, a display, a printer, a speaker, etc., and is used in outputting an inquiry, a process result, etc. to a user.

The external storage device 15 can be, for example, a magnetic disk device, an optical disk device, a magneto optical disk device, a tape device, etc. The information processing device stores the program and data in the external storage device 15, and uses it as necessary by loading it into the memory 12.

The medium drive device 16 drives a portable recording medium 19, and accesses the recorded contents. The portable recording medium 19 is any computer-readable recording medium such as a memory card, a flexible disk, CD-ROM (compact disk read only memory), an optical disk, a magnetic optical disk, etc. A user stores the program and data on the portable recording medium 19, and loads them into the memory 12 and uses them as necessary Each of the information manipulation DB 3, the task DB 5, the task index record unit 8, and the information record unit 9 shown in FIG. 2 corresponds to the memory 12, the external storage device 15, or the portable recording medium 19. The internal RAM storing the task start manipulation ID and the task start date and time, the task start manipulation ID, and the manipulation target table correspond to the memory 12.

The network connection device 17 is connected to any communication network such as a LAN (local area network), the Internet, etc., and performs a data conversion associated with the communications. The information processing device receives the program and data as necessary through the network connection device 17 from the external device, loads them into the memory 12, and uses them.

Figure 26:
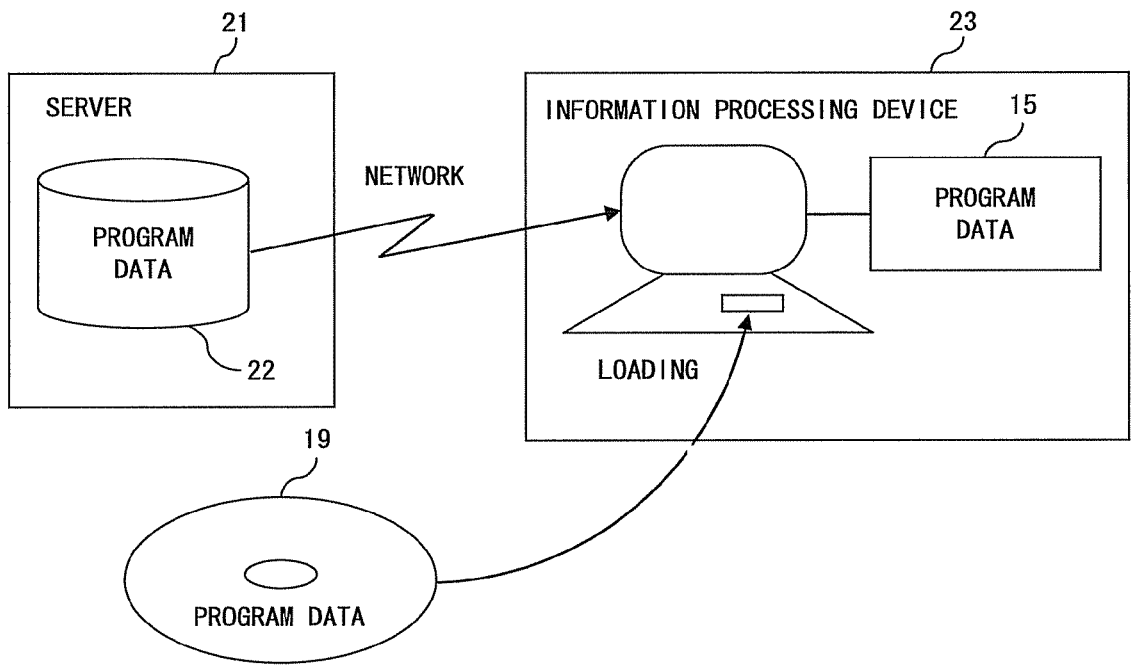
FIG. 26 shows a storage medium.

FIG. 26 shows a computer-readable recording medium capable of providing a program and data for the information processing device shown in FIG. 25. A program and data stored in a database 22 of a server 21 and the portable recording medium 19 are loaded into the memory 12 of an information processing device 23. The server 21 generates a carrier signal which carries the program and data, and transmits it to the information processing device 23 through any transmission medium over a network. The CPU 11 executes the program using the data, thereby performing a necessary process.

The present invention has been explained above in detail, but is not limited to the above-mentioned modes for embodying the present invention, and can be improved and varied within the scope of the gist of the present invention.

As described above, according to the present invention, the task of a user can be automatically detected, and an index (task index) can be generated for each information group processed in the task. Therefore, when information is searched, a generated task index is compared with a query to return an information group satisfying a search feature information as a search result. Additionally, since a task index of an information group of high similarity can be generated by comparing the similarity of the task index of each information groups, the tasks having high similarity in task index, that is, the tasks whose contents are similar, can be grouped, and information groups processed in the grouped tasks can be simultaneously searched. Therefore, the retrieval point and an information needs of a user can be considered, and the information retrieval in accordance with the contents of the user memory can be realized.

What is claimed is:

1. A search index generation apparatus, comprising:
a computing device including a processor;
a memory to store information of a first manipulation target processed in a first information manipulation performed by a user on a computer; and
an information manipulation database,
wherein the computing device includes:
an information manipulation monitor unit to detect a second information manipulation performed by the user on the computer by monitoring the second information manipulation of the user on the computer; and
a task detection unit to analyze information accumulated in the information manipulation database, to detect a first task of the user, to identify an information group processed in the first task, and to record the data relating to the first task in a task database,
wherein the information manipulation database accumulates information of a second manipulation target processed in the second information manipulation detected by the information manipulation monitor unit,
wherein the task detection unit
judges whether the second manipulation target accumulated in the information manipulation database corresponds to the first manipulation target stored in the memory, maps the first manipulation target and the second manipulation target in a vector space to obtain a first manipulation target vector and a second manipulation target vector when the second manipulation target does not correspond to the first manipulation target, obtains similarity between the first manipulation target vector and the second manipulation target vector, adds the information of the second manipulation target to the memory when the similarity is higher than a threshold, and identifies the first and second manipulation targets stored in the memory as the information group processed in the first task, detects a second task of the user that handles the second manipulation target when the similarity is lower than the threshold, judges a third information manipulation performed by the user as an information manipulation to start a third task of the user when the third information manipulation relates to a start of access to a third manipulation target and there is no manipulation target being accessed to other than the third manipulation target, judges a fourth information manipulation performed by the user as an information manipulation to terminate the third task when the fourth information manipulation relates to a termination of access to the third manipulation target and there is no manipulation target being accessed to other than the third manipulation target, and detects the third task including the third information manipulation, the fourth information manipulation and a fifth information manipulation performed by the user between the third information manipulation and the fourth information manipulation.

2. The apparatus according to claim 1, wherein the computing device further includes:

an inter-task similarity analysis unit to compare similarities of tasks using data relating to tasks accumulated in the task database, to detect tasks similar in contents, and to record data relating to a task obtained by grouping tasks similar in contents in the task database.

3. The apparatus according to claim 2, wherein the computing device further includes:

a task index generation unit to acquire the data relating to the tasks accumulated in the task database, and to generate a search index of the information group processed in each task.

4. The apparatus according to claim 3, wherein the computing device further includes:

a task index record unit to record the search index generated by the task index generation unit.

5. The apparatus according to claim 1, wherein the task detection unit detects a task of a user by segmenting an information manipulation at a constant time interval.

6. The apparatus according to claim 1, wherein the task detection unit judges a flow of an information manipulation, and detects a task of a user.

7. The apparatus according to claim 1, wherein the task detection unit first segments an information manipulation at a constant time interval, and then detects a task of a user by judging similarity of an information group processed in the segmented information manipulation.

8. The apparatus according to claim 1, wherein the task detection unit first segments an information manipulation by judging a flow of an information manipulation, and then detects a task of a user by judging similarity of an information group processed in the segmented information manipulation.

9. The apparatus according to claim 1, wherein the task detection unit defines an inner product between the first and second manipulation target vectors as the similarity.

10. The apparatus according to claim 2, wherein the inter-task similarity analysis unit maps the information group processed in the information manipulation in a vector space and defines an inner product between mapped vectors as similarity when the similarity between tasks are compared.

11. The apparatus according to claim 3, wherein a detecting of a task, a recording of data relating to the detected task in the task database, and a generating of a search index of an information group processed in the detected task are repeatedly performed, and small tasks are grouped into a large task to be recorded in the task database.

12. The apparatus according to claim 3, wherein the task index generation unit accesses to the task database when data relating to a task obtained by grouping a plurality of tasks is acquired, data relating to a task included in the grouped tasks is acquired, and a search index of an information group processed in each grouped tasks is generated.

13. The apparatus according to claim 3, wherein the task index generation unit extracts information characterizing each task from the information group processed in each task, defines the information as a search index.

14. The apparatus according to claim 13, wherein the task index generation unit uses keywords and attributes obtained by segmenting contents of an information group processed in each task as information characterizing each task in generating a search index.

15. A search index generating method executed by a computing device, the method comprising:

storing information of a first manipulation target processed in a first information manipulation performed by a user on a computer in a memory;

monitoring a second information manipulation of the user on the computer;

detecting the second information manipulation performed by the user on the computer;

accumulating information of a second manipulation target processed in the second information manipulation in an information manipulation database;

analyzing the information accumulated in the information manipulation database;

judging whether the second manipulation target accumulated in the information manipulation database corresponds to the first manipulation target stored in the memory;

mapping the first manipulation target and the second manipulation target in a vector space to obtain a first manipulation target vector and a second manipulation target vector when the second manipulation target does not correspond to the first manipulation target;

obtaining similarity between the first manipulation target vector and the second manipulation target vector;

adding the information of the second manipulation target to the memory when the similarity is higher than a threshold;

detecting a first task of the user by identifying the first and second manipulation targets stored in the memory as an information group processed in the first task;

recording data relating to the first task in a task database;

detecting a second task of the user that handles the second manipulation target when the similarity is lower than the threshold;

judging a third information manipulation performed by the user as an information manipulation to start a third task of the user when the third information manipulation relates to a start of access to a third manipulation target and there is no manipulation target being accessed to other than the third manipulation target;

judging a fourth information manipulation performed by the user as an information manipulation to terminate the third task when the fourth information manipulation relates to a termination of access to the third manipulation target and there is no manipulation target being accessed to other than the third manipulation target; and detecting the third task including the third information manipulation, the fourth information manipulation and a fifth information manipulation performed by the user between the third information manipulation and the fourth information manipulation.

16. The method according to claim 15, wherein
comparing similarities of tasks using data relating to tasks accumulated in the task database;
detecting tasks similar in contents; and
recording data relating to a task obtained by grouping tasks similar in contents in the task database.

17. The method according to claim 16, further comprising
acquiring the data relating to the tasks accumulated in the task database; and
generating a search index of the information group processed in each task.

18. A computer-readable recording medium storing a search index generating program used to direct a computing device to perform a method comprising:
storing information of a first manipulation target processed in a first information manipulation performed by a user on a computer in a memory;
monitoring a second information manipulation performed by the user on the computer;
detecting the second information manipulation performed by the user on the computer;
accumulating information of a second manipulation target processed in the second information manipulation in an information manipulation database;
analyzing the information accumulated in the information manipulation database;
judging whether the second manipulation target accumulated in the information manipulation database corresponds to the first manipulation target stored in the memory;
mapping the first manipulation target and the second manipulation target in a vector space to obtain a first manipulation target vector and a second manipulation target vector when the second manipulation target does not correspond to the first manipulation target;
obtaining similarity between the first manipulation target vector and the second manipulation target vector;
adding the information of the second manipulation target to the memory when the similarity is higher than a threshold;
detecting a first task of the user by identifying the first and second manipulation targets stored in the memory as an information group processed in the first task;
recording data relating to the first task in a task database;
detecting a second task of the user that handles the second manipulation target when the similarity is lower than the threshold,
judging a third information manipulation performed by the user as an information manipulation to start a third task of the user when the third information manipulation relates to a start of access to a third manipulation target and there is no manipulation target being accessed to other than the third manipulation target;
judging a fourth information manipulation performed by the user as an information manipulation to terminate the third task when the fourth information manipulation relates to a termination of access to the third manipulation target and there is no manipulation target being accessed to other than the third manipulation target; and
detecting the third task including the third information manipulation, the fourth information manipulation and a fifth information manipulation performed by the user between the third information manipulation and the fourth information manipulation.

19. The recording medium according to claim 18, wherein the program makes the computing device to further execute:
comparing similarities of tasks using data relating to tasks accumulated in the task database;
detecting tasks similar in contents; and
recording data relating to a task obtained by grouping tasks similar in contents in the task database.

* * * * *